US007567896B2

(12) United States Patent
Coorman et al.

(10) Patent No.: US 7,567,896 B2
(45) Date of Patent: Jul. 28, 2009

(54) CORPUS-BASED SPEECH SYNTHESIS BASED ON SEGMENT RECOMBINATION

(75) Inventors: Geert Coorman, Kortrijk (BE); Vincent Pollet, Aalbeke (BE); Stefaan Van Gerven, Heverlee (BE); Mario De Bock, Ronse (BE); Bert Van Coile, Bruges (BE); Jan De Moortel, Kortrijk (BE)

(73) Assignee: Nuance Communications, Inc., Burlington, MA (US)

( * ) Notice: Subject to any disclaimer, the term of this patent is extended or adjusted under 35 U.S.C. 154(b) by 895 days.

(21) Appl. No.: 11/037,545

(22) Filed: Jan. 18, 2005

(65) Prior Publication Data

US 2005/0182629 A1 Aug. 18, 2005

Related U.S. Application Data

(60) Provisional application No. 60/537,125, filed on Jan. 16, 2004.

(51) Int. Cl.
*G06F 17/21* (2006.01)

(52) U.S. Cl. .......................................................... 704/10

(58) Field of Classification Search .................... 704/10
See application file for complete search history.

(56) References Cited

U.S. PATENT DOCUMENTS

| | | | | |
|---|---|---|---|---|
| 5,153,913 | A * | 10/1992 | Kandefer et al. | 704/260 |
| 5,384,893 | A | 1/1995 | Hutchins | 704/246 |
| 5,479,564 | A | 12/1995 | Vogten et al. | 395/2.76 |
| 5,490,234 | A | 2/1996 | Narayan | 395/2.69 |
| 5,611,002 | A | 3/1997 | Vogten et al. | 395/2.76 |
| 5,630,013 | A | 5/1997 | Suzuki et al. | 395/2.25 |
| 5,652,828 | A * | 7/1997 | Silverman | 704/260 |
| 5,749,064 | A | 5/1998 | Pawate et al. | 704/213 |
| 5,774,854 | A | 6/1998 | Sharman | 704/260 |
| 5,913,193 | A | 6/1999 | Juang et al. | 704/258 |
| 5,920,840 | A | 7/1999 | Satyamurti et al. | 704/267 |
| 5,970,453 | A * | 10/1999 | Sharman | 704/260 |
| 5,978,764 | A | 11/1999 | Lowry et al. | 704/258 |
| 6,665,641 | B1 * | 12/2003 | Coorman et al. | 704/260 |
| 6,980,955 | B2 * | 12/2005 | Okutani et al. | 704/258 |
| 7,069,216 | B2 * | 6/2006 | DeMoortel et al. | 704/260 |
| 7,136,818 | B1 * | 11/2006 | Cosatto et al. | 704/275 |
| 7,219,060 | B2 * | 5/2007 | Coorman et al. | 704/258 |

OTHER PUBLICATIONS

Black, Alan W., et al, "Chatr: a genetic speech synthesis system", In Proceedings of COLING, 94 Kyoto, Japan.

Campbell, Nick, "Processing a Speech Corpus for Synthesis with Chatr", ICSP '97 (International Conference on Speech Processing), Seoul, Korea Aug. 26, 1997.

Banga, Eduardo R., et al, "Shape-Invariant Pitch-Synchronous Text-to-Speech Conversion", Proceedings of the International Conference on Acoustics, Speech, and Signal Processing (ICASSP), IEEE, 1995, pp. 656-659.

(Continued)

*Primary Examiner*—Michael N Opsasnick
(74) *Attorney, Agent, or Firm*—Bromberg & Sunstein LLP

(57) ABSTRACT

A system and method generate synthesized speech through concatenation of speech segments that are derived from a large prosodically-rich corpus of speech segments including using an additional dictionary of speech segment identifier sequences.

30 Claims, 16 Drawing Sheets

OTHER PUBLICATIONS

Black, Alan W., et al, "Automatically Clustering Similar Units for Unit Selection in Speech Synthesis", Proceedings of Eurospeech 97, Sep. 1997, pp. 601-604, Rhodes, Greece.
Black, Alan W., et al, "Optimising Selection of Units from Speech Databases for Concatenative Synthesis", European Conference on Speech Communication and Technology, Madrid, Sep. 1995, pp. 581-584.
Campbell, Nick, et al, "Chatr: A Natural Speech Re-Sequencing Synthesis System", Apr. 8, 1998.
Charpentier, F. J., et al, "Diphone Synthesis Using an Overlap-Add Technique for Speech Waveforms Concatenation", IEEE, 1986, pp. 2015-2018.
Conkie, Alistair D., "Optimal Coupling of Diphones", in J.P.H. van Santen, et al , editors, Progress in Speech Synthesis, Springer verlag, 1997, pp. 293-304.
Coorman, et al, "Segment Selection in the L&H RealSpeak Laboratory TTS System".
Ding, Wen, et al, "Optimising Unit Selection with Voice Source and Formants in the Chatr Speech Synthesis System", Proceedings of Eurospeech 97, Sep. 1997, pp. 537-540, Rhodes, Greece.
Dutoit, T., "High Quality Test-to-Speech Synthesis: A Comparison of Four Candidate Algorithms", IEEE, 1994, pp. I-565-I-568.
Edgington, M>, "Investigating the Limitations of Concatenative Synthesis", Eurospeech, 1997, pp. 1-4.
Edgington, M., et al, "Overview of Current Text-to-Speech Techniques: Part II—Prosody and Speech Generation", BT Technology Journal, vol. 14, No. 1, Jan. 1996, pp. 84-99.
Hamdy, Khaled N., et al, "Time-Scale Modification of Audio Signals with Combined Harmonic and Wavelet Representations", Proceedings of ICASSP 97, pp. 439-442, Munich, Germany.
Hauptmann, Alexander, "Speakez: A First Experiment in Concatenation Synthesis from a Large Corpus", Proceedings of Eurospeech93, Sep. 1993, pp. 1701-1705, Berlin, Germany.
Hess, Wolfgang, J., "Speech Synthesis—A Solved Problem?", Signal Processing, Elsevier Science Publishers B.V., 1992.
Hirokawa, Tomohisa, et al, "High Quality Speech Synthesis System Based on Waveform Concatenation of Phoneme Segment", IEICE Trans. Fundamentals, vol. E76-A, No. 11, Nov. 1993, pp. 1964-1970.
Huang, X, et al, Recent Improvements on Microsoft's Trainable Text-to-Speech System—Whistler, Proceedings of ICASSP '97, Apr. 1997, pp. 959-962, Munich, Germany.
Hunt, Andrew J., et al, "Unit Selection in a Concatenative Speech Synthesis System Using a Large Speech Database", IEEE International Conference on Acoustics, Speech and Signal Processing Conference Proceedings, May 1996, vol. 1, pp. 373-376.
Iwahashi, Naoto, et al, "Concatenative Speech Synthesis by Minimum Distortion Criteria", IEEE, 1992, pp. II-65-II-68.
King, Simon, et al, "Speech Synthesis Using Non-Uniform Units in the Verbmobil Project", Proceedings of Eurospeech '97, Europress, 97, Sep. 1997, pp. 569-572, Rhodes, Greece.
Klatt, Dennis H., "Review of Text-to Speech Conversion for English", Journal of Acoustic Society of America, 82 (3) Sep. 1987, pp. 737-793.
Lee, Sungjoo, et al, "Variable Time-Scale Modification of Speech Using Transient Information", Proceedings of ICASSP '97, Apr. 1997, pp. 1319-1322, Munich, Germany.
Lin, Gang-Janp, et al, "High Quality of Low Complexity Pitch Modification of Acoustic Signals", IEEE, 1995, pp. 2987-2990.
Kraft, Volker, "Does the Resulting Speech Quality Improvement Make a Sophisticated Concatenation of Time-Domain Synthesis Units Worthwhile?", Proc. 2.sup.nd ESCA/IEEE Workshop on Speech Synthesis, 1994, pp. 65-68.
Laroche, Jean, et al, "HNS: Speech Modification Based on a Harmonic + Noise Model",IEEE, 1993, pp. II-550-II-553.
Moulines, E., et al, "A Real-Time French Text-to-Speech System Generating High-Quality Synthetic Speech", International Conference on Acoustics, Speech & Signal Processing, ICASSP, IEEE, 1990, vol. 15, pp. 309-312.
Nakajima, Shin'ya, "Automatic Synthesis Unit Generation for English Speech Synthesis Based on Multi-Layered Context Oriented Clustering", Speech Communication, vol. 14, 1994, pp. 313-324.
Portele, Thomas, et al, "A Mixed Inventory Structure for German Concatenative Synthesis", Progress in Speech Synthesis, J.P.H. van Santen, et al, editors, Springer verlag, 1997, pp. 263-277.
Quartieri, T.F., et al, "Time-Scale Modification of Complex Acoustic Signals", IEEE, 1993, pp. I-213-I-216.
Rudnicky, Alexander I., et al, "Survey of Current Speech Technology", Communication of the ACM, vol. 37, No. 3, Mar. 1994, pp. 52-57.
Sagisaka, Yoshinori, "Speech Synthesis by Rule Using an Optimal Selection of Non-Uniform Synthesis Units", IEEE, 1998, pp. 679-682.
Saito, Takashi, et al, "High-Quality Speech Synthesis Using Context-Dependent Syllabic Units", Proceedings of ICASSP '96, May 1996, pp. 381-384, Atlanta, Georgia.
Verhelst, Werner, et al, "An Overlap-Add Technique Based on Waveform Similarity (WSOLA) for High Quality Time-Scale Modification of Speech", IEEE, 1993, pp. II-554-II-557.
Yim, S., et al, "Computationally Efficient Algorithm for Time Scale Modification GLS-TSM", Proceedings of ICASSP '96, May 1996, pp. 1009-1012, Atlanta, Georgia.
Rutten, Peter, et al, "Issues in Corpus Based Speech Synthesis", *IEE Seminar "State of the Art In Speech Synthesis"*, London, Apr. 2000.
Iwahashi, Naoto, et al, "Speech Segment Network Approach for Optimization of Synthesis Unit Set", Computer Speech and Language, 1995, pp. 335-352.

* cited by examiner

CORPUS-BASED SPEECH SYNTHESIS BASED ON SEGMENT RECOMBINATION

This application claims priority from provisional application 60/537,125, filed Jan. 16, 2004, the contents of which are incorporated herein by reference.

FIELD OF THE INVENTION

The present invention relates to generating synthesized speech through concatenation of speech segments that are derived from a large prosodically-rich corpus of speech segments including using an additional dictionary of speech segment identifier sequences.

BACKGROUND ART

Machine-generated speech can be produced in many different ways and for many different applications. The most popular and practical approach towards speech synthesis from text is the so-called concatenative speech synthesis technique in which segments of speech extracted from recorded speech messages are concatenated sequentially, generating a continuous speech signal.

Many different concatenative synthesis techniques have been developed, which can be classified by their features:

- The type of the smallest speech segments (diphones, demi-phones, phones, syllables, words, phrases . . . )
- The number of prototypes for each speech segment class (one prototype per speech segment vs. many prototypes per speech segment)
- The signal representation of the basic speech units (prosody modification vs. no prosody modification)
- Prosody modification techniques (LPC, TD-PSOLA, HNM . . . )

A common method for generating speech waveforms is by a speech segment composition process that consists of re-sequencing and concatenating digital speech segments that are extracted from recorded speech files stored in a speech corpus, thereby avoiding substantial prosody modifications.

The quality of segment resequencing systems depends among other things on appropriate selection of the speech units and the position where they are concatenated. The synthesis method can range from restricted input domain-specific "canned speech" synthesis where sentences, phrases, or parts of phrases are retrieved from a database, to unrestricted input corpus-based unit selection synthesis where the speech segments are obtained from a constrained optimization problem that is typically solved by means of dynamic programming.

Table 1 establishes a typology of TTS engines depending on several characteristics.

TABLE 1

| | Canned speech | Domain Specific corpus-based | General Purpose Corpus-Based |
|---|---|---|---|
| Quality/naturalness | Transparent | High | Medium |
| Selection complexity | Trivial | Complex | Very complex |
| Unit Size after selection | Determined | Variable | Variable |
| Number of units | Small | Medium | Large |
| Segmental and Prosodic Richness | Low | Low | High |
| Vocabulary | Strictly Limited | Limited | Unlimited |
| Flexibility | Low | Low | Limited |
| Footprint | Application dependent | Medium | Large |

All the technologies mentioned in Table 1 are currently available in the TTS market. The choice of TTS integrators in different platforms and products is determined by a compromise between processing power needs, storage capacity requirements (footprint), system flexibility, and speech output quality.

In contrast to corpus-based unit selection synthesis, canned speech synthesis can only be used for restricted input domain-specific applications where the output message set is finite and completely described by means of a number of indices that refer to the actual speech waveforms.

While canned speech synthesizers use large units such as phrases (described in E. Klabbers, "*High-Quality Speech Output Generation Through Advanced Phrase Concatenation*," Proc. of the COST Workshop on Speech Technology in the Public Telephone Network: Where are we today?, Rhodes, Greece, pages 85-88, 1997), words (described in H. Meng, S. Busayapongchai, J. Glass, D. Goddeau, L. Hetherington, E. Hurley, C. Pao, J. Polifroni, S. Sene, and V. Zue, "*WHEELS: A Conversational System In The Automobile Classifieds Domain*," in Proc. ICSLP '96, Philadelphia, Pa., October 1996, pp. 542-545), and morphemes, corpus-based speech synthesizers use smaller units such as phones (described in A. W. Black, N. Campbell, "*Optimizing Selection Of Units From Speech Databases For Concatenative Synthesis*," Proc. Eurospeech '95, Madrid, pp. 581-584, 1995), diphones (described in P. Rutten, G. Coorman, J. Fackrell & B. Van Coile, "*Issues in Corpus-based Speech Synthesis*," Proc. IEE symposium on state-of-the-art in Speech Synthesis, Savoy Place, London, April 2000), and demi-phones (described in M. Balestri, A. Pacchiotti, S. Quazza, P. L. Salza, S. Sandri, "*Choose The Best To Modify The Least: A New Generation Concatenative Synthesis System*," Proc. Eurospeech '99, Budapest, pp. 2291-2294, September 1999).

Both types of applications use a different unit size because the size of the database grows exponentially with the size of the unit under the condition of full coverage. Canned speech synthesis is widely used in domain specific areas such as announcement systems, games, speaking clocks, and IVR systems.

Corpus-based speech synthesis systems make use of a large segment database. A large segment database refers to a speech segment database that references speech waveforms. The database may directly contain digitally sampled waveforms, or it may include pointers to such waveforms, or it may include pointers to parameter sets that govern the actions of a waveform synthesizer. The database is considered "large" when, in the course of waveform reference for the purpose of speech synthesis, the database commonly references many waveform candidates, occurring under varying linguistic conditions. In this manner, most of the time in speech synthesis, the database will likely offer many waveform candidates from which a single waveform is selected. The availability of many such waveform candidates can permit prosodic and other linguistic variation in the speech output stream.

Speech resequencing systems access an indexed database composed of natural speech segments. Such a database is commonly referred as the speech segment database. Besides the speech waveform data, the speech segment database contains the locations of the segment boundaries, possibly enriched by symbolic and acoustic features that discriminate the speech segments. The speech segments that are extracted from this database to generate speech are often referred in speech processing literature as "speech units" (SU). These units can be of variable length (e.g. polyphones). The smallest units that are used in the unit selector framework are called basic speech units (BSUs). In corpus-based speech synthesis, these BSUs are phonetic or sub-word units. If part of a synthesized message is constructed from a number of BSUs that are adjacent in the speech corpus (i.e. convex sequence of BSUs), then the concatenation step can be avoided between these units. We will use the term Monolithic Speech Unit (MSU) when it's necessary to emphasize that a given speech unit corresponds to a convex sequence of BSUs.

A corpus-based speech synthesizer includes a large database with speech data and modules for linguistic processing, prosody prediction, unit selection, segment concatenation, and prosody modification. The task of the unit selector is to select from a speech database the 'best' sequence of speech segments (i.e. speech units) to synthesize a given target message (supplied to the system as a text).

The target message representation is obtained through analysis and transformation of an input text message by the linguistic modules. The target message is transformed to a chain of target BSU representations. Each target BSU representation is represented by a target feature vector that contains symbolic and possibly numeric values that are used in the unit selection process. The input to the unit selector is a single phonetic transcription supplemented with additional linguistic features of the target message. In a first step, the unit selector converts this input information into a sequence of BSUs with associated feature vectors. Some of the features are numeric, e.g. syllable position in the phrase. Others are symbolic, such as BSU identity and phonetic context. The features associated with the target diphones are used as a way to describe the segmental and prosodic target in a linguistically motivated way. The BSUs in the speech database are also labeled with the same features.

For each BSU in the target description, the unit selector retrieves the feature vectors of a large number of BSU candidates (e.g. diphones as illustrated in FIG. 1). Each BSU candidate is described by a speech unit descriptor that consists of a speech unit feature vector and a reference to the speech unit waveform parameters that is sometimes referred to as a segment identifier. This is shown in FIG. 2. FIG. 3 shows how the speech unit feature vector can be split into an acoustic part and a linguistic part.

Each of these candidate BSUs is scored by a multi-dimensional cost function that reflects how well its feature vector matches the target feature vector—this is the target cost. A concatenation cost is calculated for each possible sequence of BSU candidates. This too is calculated by a multi-dimensional cost function. In this case the cost reflects the cost of joining together two candidate BSUs. If the prosodic or spectral mismatch at the segment boundaries of two candidates exceeds the hearing threshold, concatenation artifacts occur.

In order to reduce and preferably avoid concatenation artifacts, masking functions (as defined in G. Coorman, J. Fackrell, P. Rutten & B. Van Coile, "*Segment selection in the L&H Realspeak laboratory TTS system*", Proceedings of ICSLP 2000, pp. 395-398) that facilitate the rejection of bad segment combinations in the unit selection process are introduced. A dynamic programming algorithm is used to find the lowest cost path through all possible sequences of candidate BSUs, taking into account a well-chosen balance between target costs and concatenation costs. The dynamic programming assesses many different paths, but only the BSU sequence that corresponds with the lowest cost path is retained and converted to a speech signal by concatenating the corresponding monolithic speech units (e.g. polyphones as illustrated in FIG. 1).

Although the quality of corpus-based speech synthesis systems is often very good, there is a large variance in the overall speech quality. This is mainly because the segment selection process as described above is only an approximation of a complex perceptual process.

FIG. 1 depicts a typical corpus-based synthesis system. The text processor 101 receives a text input, e.g., the text phrase "Hello!" The text phrase is then converted by the linguistic processor 101 which includes a grapheme to phoneme converter into an input phonetic data sequence. In FIG. 1, this is a simple phonetic transcription—#'hE-lO#. In various alternative embodiments, the input phonetic data sequence may be in one of various different forms.

The input phonetic data sequence is converted by the target generator 111 into a multi-layer internal data sequence to be synthesized. This internal data sequence representation, known as extended phonetic transcription (XPT), contains mainly the linguistic feature vectors (including phonetic descriptors, symbolic descriptors, and prosodic descriptors) such as those in the speech segment database 141.

The unit selector 131 retrieves from the speech segment database 141 descriptors of candidate speech units that can be concatenated into the target utterance specified by the XPT transcription. The unit selector 131 creates an ordered list of candidate speech units by comparing the XPTs of the candidate speech units with the target XPT, assigning a target cost to each candidate. Candidate-to-target matching is based on symbolic feature vectors, such as phonetic context and prosodic context, and numeric descriptors, and determines how well each candidate fits the target specification. Poorly matching candidates may be excluded at this point.

The unit selector 131 determines which candidate speech units can be concatenated without causing disturbing quality degradations such as clicks, pitch discontinuities, etc. Successive candidate speech units are evaluated by the unit selector 131 according to a quality degradation cost function. Candidate-to-candidate matching uses frame-based information such as energy, pitch and spectral information to determine how well the candidates can be joined together. Using dynamic programming, the best sequence of candidate speech units is selected for output to the speech waveform concatenator 151.

The speech waveform concatenator 151 requests the output speech units (e.g. diphones and/or polyphones) from the speech unit database 141 for the speech waveform concatenator 151. The speech waveform concatenator 151 concatenates the speech units selected forming the output speech that represents the target input text.

It has been reported that the average quality of unit selection synthesis is increased if the application domain is closer to the domain of the recordings. Canned speech synthesis, which is a good example of domain specific synthesis, results in high quality and extremely natural synthesis beyond the quality of current corpus-based speech synthesis systems. The success of canned speech synthesis lies in the size of the speech segments that are being used. By recording words and phrases in prosodic contexts similar to the ones in which they will be used, a very high naturalness can be achieved. Because the segments used in canned speech applications are large, they embed detailed linguistic and paralinguistic information. It is not straightforward to embed this information in synthesized speech waveforms by concatenating smaller segments such as diphones or demi-phones using automatic algorithms.

The quality of domain-specific unrestricted input TTS can be further increased by combining canned speech synthesis with corpus-based speech synthesis into carrier-slot synthesis. Carrier-slot speech synthesis combines carrier phrases (i.e. canned speech) with open slots to be filled out by means of corpus-based concatenative synthesis. The corpus-based synthesis can take into account the properties of the boundaries of the carriers to select the best unit sequences.

Canned speech synthesis systems work with a fixed set of recorded messages that can be combined to create a finite set of output speech messages. If new speech messages have to be added, new recordings are required. This also means that the size of the database grows almost linearly with the number of messages that can be generated. Similar remarks can be made about corpus-based synthesis. Whatever speech unit is used in the database, it is desirable that the database offers sufficient coverage of the units to make sure that an arbitrary input text can be synthesized with a more or less homogeneous quality. In practical circumstances it is difficult to achieve full coverage. In what follows we will refer to this as the data scarcity problem.

A common approach to increase the number of messages that can be synthesized with high quality is to add more speech data to the speech unit database until the average quality of the system saturates. This approach has several drawbacks such as:

- Long production cycle (recording/segmentation/annotation/validation)
- Large databases, consuming lots of memory
- Slowdown of the unit selection process because of increased search space
- Speaker's timbre may change over time The speech segment database development procedure starts with making high quality recordings in a recording studio followed by auditory and visual inspection. Then an automatically generated phonetic transcription is verified and corrected in order to describe the speech waveform correctly. Automatic segmentation results and prosodic annotation are manually verified and corrected. The acoustic features (spectral envelope, pitch, etc.) are estimated automatically by means of techniques well known in the art of speech processing. All features which are relevant for unit selection and concatenation are extracted and/or calculated from the raw data files.

Single speaker speech compression at bit rates far below the bit rates of traditional coding systems can be accomplished by resequencing speech segments. Such coders are referred to as very low bit rate (VLBR) coders. Initially, VLBR coding was achieved by modeling speech as a sequence of acoustically segmented variable-length speech segments.

Phonetic vocoding techniques can achieve lower bit rates by extracting more detailed linguistic knowledge of the information embedded in the speech signal. The phonetic vocoder distinguishes itself from a vector quantization system in the manner in which spectral information is transmitted. Rather than transmitting individual codebook indices, a phone index is transmitted along with auxiliary information describing the path through the model.

Phonetic vocoders were initially speaker specific coders, resulting in a substantial coding gain because there was no need to transmit speaker specific parameters. The phonetic vocoder was later on extended to a speaker independent coder by introducing multiple-speaker codebooks or speaker adaptation. The voice quality was further improved where the decoding stage produced PCM waveforms corresponding to the nearest templates and not based on their spectral envelope representation. Copy synthesis was then applied to match the prosody of the segment prototype appropriately to the prosody of the target segment. These prosodically modified segments are then concatenated to produce the output speech waveform. It was reported that the resulting synthesized speech had a choppy quality, presumably due to spectral discontinuities at the segment boundaries.

The naturalness of the decoded speech was further increased by using multiple segment candidates for each recognized segment. In order to select the best sounding segment combination, the decoder performs a constrained optimization similar to the unit selection procedure in corpus-based synthesis.

Extremely low bit rates were achieved by combining an ASR system with a TTS system. But these systems are very error prone because they depend on two processes that introduce significant errors.

SUMMARY OF THE INVENTION

A representative embodiment of the present invention includes a system and method for producing synthesized speech from message designators. A first large speech segment database references speech segments, where the database is accessed by speech segment designators. Each speech segment designator is associated with a sequence of speech segments having at least one speech segment. A segmental transcription database references segmental transcriptions that can be decoded as a sequence of segment designators, where the segmental transcription database is accessed by the message designators. Each message designator is associated with a fixed message. A first speech segment selector sequentially selects a number of speech segments referenced by the speech segment database using a sequence of speech segment designators that is decoded from a segmental transcription retrieved from the segmental transcription database. A speech segment concatenator in communication with the first speech segment database concatenates the sequence of speech segments designated by a segmental transcription from the segmental transcription database to produce a speech signal output.

A further embodiment includes a digital storage medium in which the speech segments are stored in speech-encoded form, and a decoder that decodes the encoded speech segments when accessed by speech segment selector.

Another embodiment includes a system and method for producing synthesized speech from input text and from input message designators. A first and a second large speech segment database reference speech segments, where the database is accessed by speech segment designators. Each speech segment designator is associated with a sequence of basic speech segments having at least one basic speech segment. A segmental transcription database references segmental transcriptions, where each segmental transcription can be decoded as a sequence of segment designators of the first large speech segment database, and wherein the segmental transcription database is accessed by the message designators, each message designator being associated with a fixed message. A text message database references text messages that correspond to the orthographic representation of the segmental transcriptions of the segmental transcription database. A first speech segment selector sequentially selects a number of speech segments referenced by the first speech segment database using a sequence of speech segment designators that is decoded from the segmental transcription corresponding to the message designator. A text analyzer converts the input text into a sequence of symbolic segment identifiers. A second speech segment selector, in communication with the second speech segment database, selects, based at least in part on prosodic and acoustic features, speech segments referenced by the database using speech segment designators that correspond to a phonetic transcription input. A message decoder activates the first speech segment selector if the input text corresponds to a text message from the text message database or activates the second speech segment selector if the input text does not correspond to a message from the text message database. A speech segment concatenator in communication with the first and second speech segment database concatenates the sequence of speech segments designated by a segmental transcription from the segmental transcription database to produce a speech signal output.

In a further embodiment, the first and second speech segment database may be the same, or the first speech segment database may be a subset of the second speech segment database, or the first and second speech segment database may be disjoint. The first and second database may reside on physically different platforms such that a data stream consisting of segment transcriptions, speech transformation descriptors, and control codes is transmitted from one platform to another enabling distributed synthesis.

In various embodiments, the messages may correspond to words and/or multi-word phrases, such as for a talking dictionary application. The segment designators may be one or more of the following types: (i) diphone designators, (ii) demi-phone designators, (iii) phone designators, (iv) triphone designators, (v) demi-syllable designators, and (vi) syllable designators.

The speech segment concatenator may not alter the prosody of the speech segments. The speech segment concatenator may smooth energy at the concatenation boundaries of the speech segments, and/or smooth the pitch at the concatenation boundaries of the speech segments.

The segment selector may be tunable and alternative segment candidates may be selected by a user to generate a segmental transcription database. The segment selector may be trained on a given segment transcriptor database and alternative segment candidates may be selected by a user or automatically to generate a segmental transcription database or speech.

Embodiments may also include closed loop corpus-based speech synthesis, i.e., speech synthesis consisting of an iteration of synthesis attempts in which one or more parameters for unit selection or synthesis are adapted in small steps in such a way that speech synthesis improves in quality.

DETAILED DESCRIPTION OF SPECIFIC EMBODIMENTS

Figure 1:
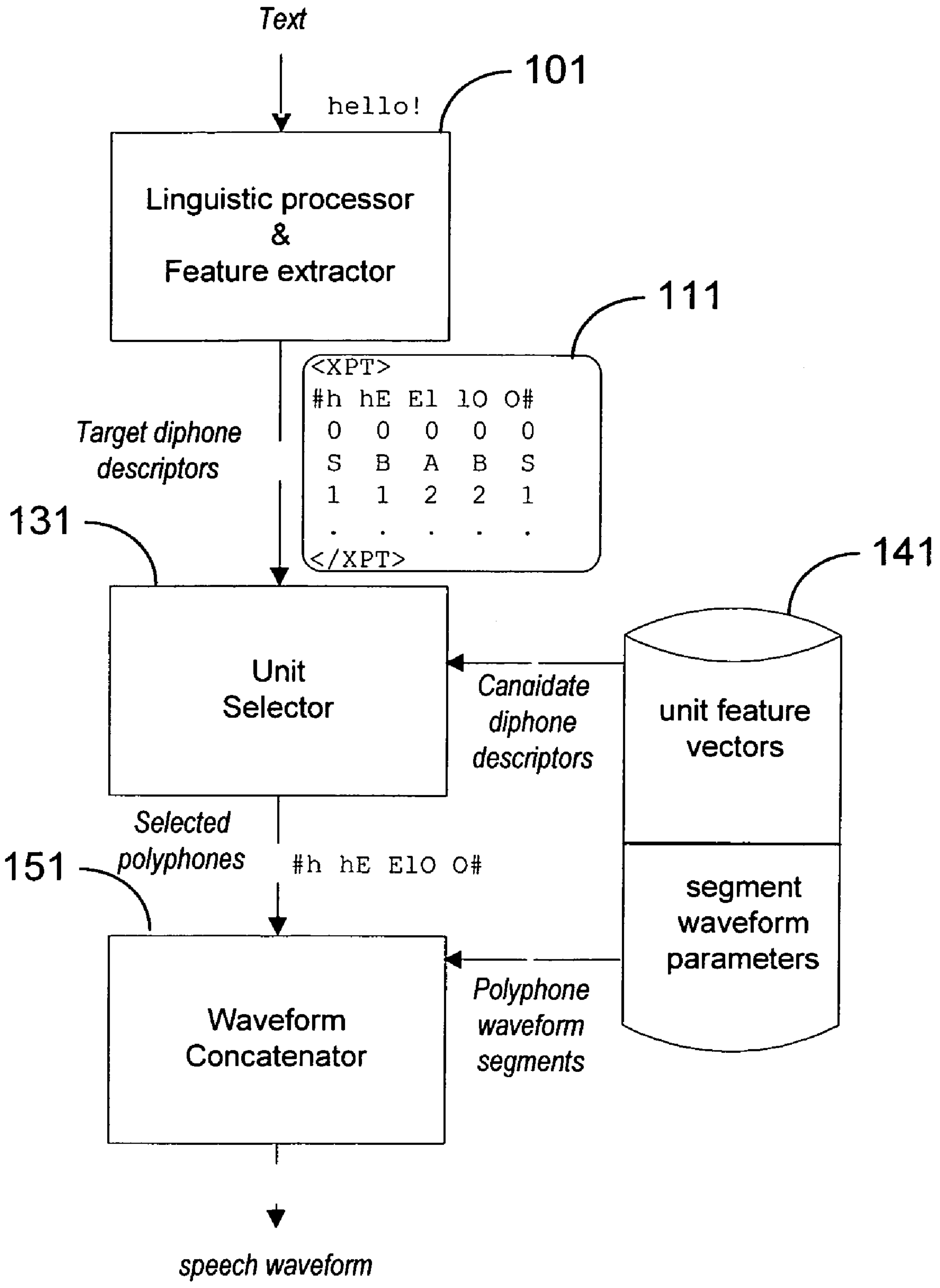
FIG. 1 shows is a schematic drawing showing the basic components of a corpus-based speech synthesizer.
Figure 2:
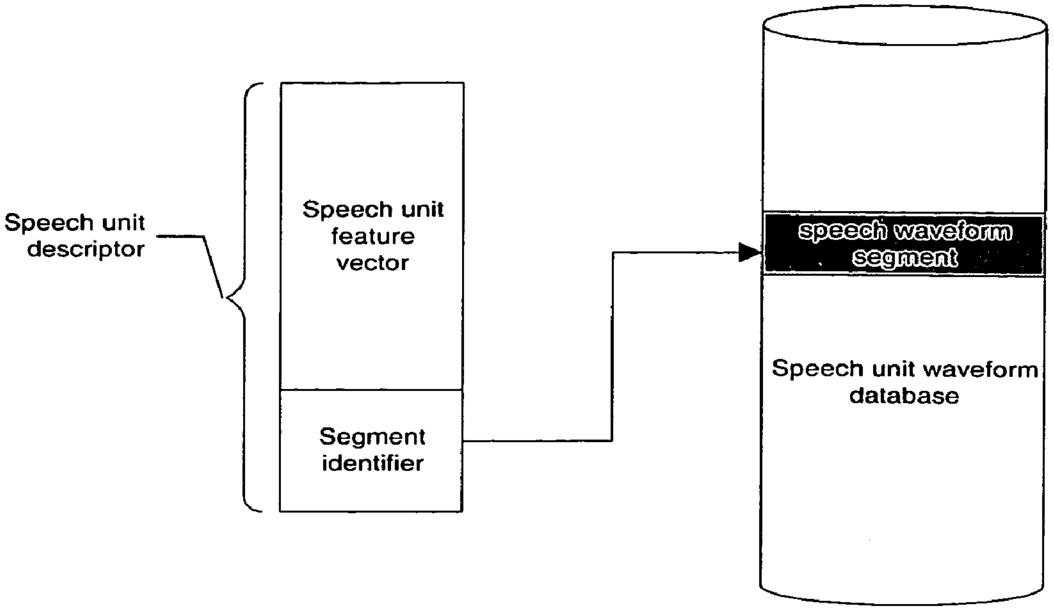
FIG. 2 is a schematic drawing showing the most important components of a speech unit descriptor of a basic speech unit.
Figure 3:
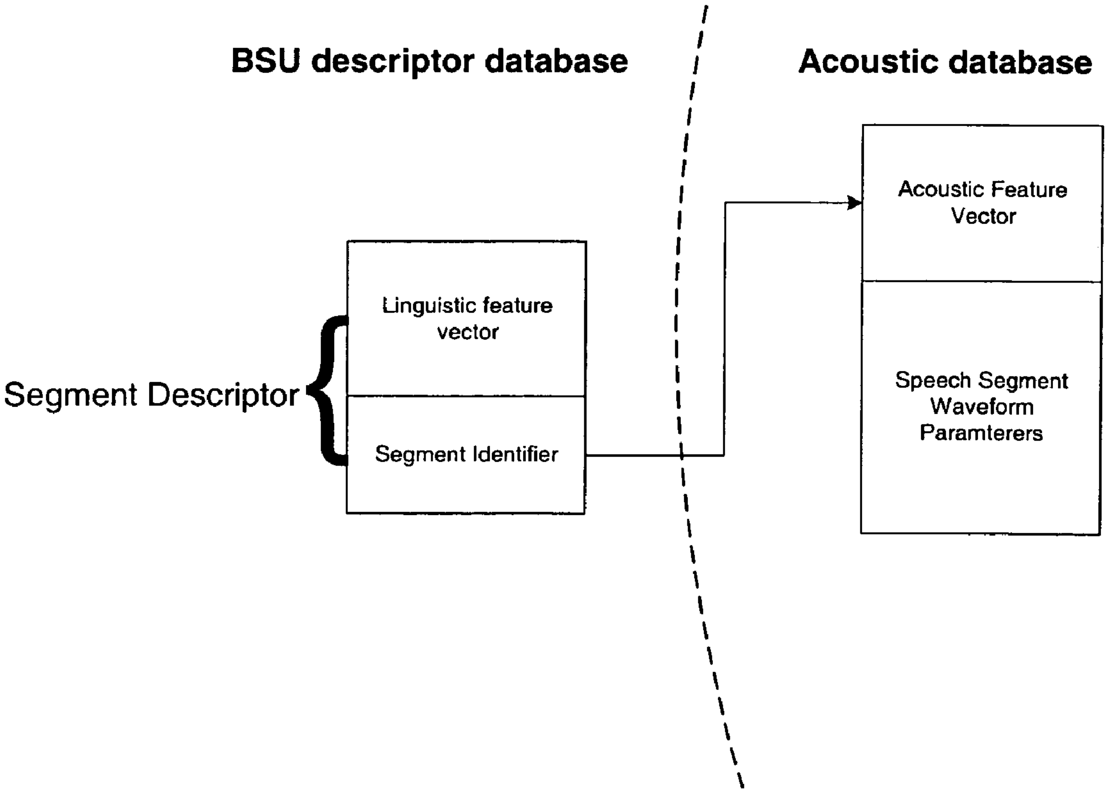
FIG. 3 is a schematic drawing showing how the speech unit feature vector is split into an acoustic part and a linguistic part.

The following description is illustrative of the invention and is not to be construed as limiting the invention. Several details are described to obtain a thorough understanding of present invention. However, in certain circumstances, well known, or conventional details are not described in order not to obscure the present invention in detail. Reference throughout this specification to "one embodiment", "an embodiment", "preferred embodiment" or "another embodiment" indicates that a particular feature, structure, or characteristic described in connection with the embodiment is included in at least one embodiment of the present invention. Thus, the appearance of the phrase "in one embodiment", "in an embodiment", or "in a preferred embodiment" in various places throughout the specification are not necessarily all referring to the same embodiment. Furthermore, the particular features, structures, or characteristic may be combined in any suitable manner in one or more embodiments.

Various embodiments of the present invention are directed to techniques for corpus-based speech synthesis based on concatenation of carefully selected speech units, such as that described in G. Coorman, J. De Moortel, S. Leys, M. De Bock, F. Deprez, J. Fackrell, P. Rutten, A. Schenk & B. Van Coile, "*Speech Synthesis Using Concatenation Of Speech Waveforms*," U.S. Pat. 6,665,641, incorporated herein by reference. Such approaches can lead to synthetic speech that is perceptually indistinguishable from speech produced by a human speaker, which we refer to as "transparent synthesis."

From a perceptual point of view, transparent synthesis results are equivalent to natural speech signals and can thus be added to the segment database. These transparent synthesis results are intrinsically phoneme segmented and annotated because they are derived from segmented and annotated speech data. The transparent synthesis results are not monolithic but are composed of a sequence of monolithic speech units. Therefore we will also refer to them as "compound messages."

When added to the speech database, the unit selector can extract convex chains of speech units (i.e. chains of consecutive speech units) from the compound messages. We will refer to these convex chains of BSUs as “compound monolithic speech units” (CMSUs) to distinguish them from the traditional monolithic speech units. All elementary units derived from compound messages that are added to the large segment database will be referred to as “compound speech units” (CSUs) to distinguish them from the standard basic speech units. As will be shown further on, the feature vector of a CSU will often differ from the feature vector of the corresponding BSU from which it is drawn from.

The term “compound” as used in compound speech unit has a double meaning. Compound refers to the compound messages that compound speech units are extracted from, and also to the fact that the feature vector is the compound of a modified linguistic feature vector and an acoustic feature vector that belongs to the corresponding BSU.

CMSUs have the same properties for synthesis as monolithic speech units, but are not adjacent in the original recorded speech signal from which they are extracted. The unit selector of the diphone system, depicted in FIG. 1, returns compound polyphones instead of monolithic polyphones. However, the speech waveforms of the speech units belonging to the compound utterances are redundant because they are derived from the same speech unit database. By adding compound messages as new sequences of BSUs, the concept of segment adjacency can be stretched towards non-contiguous BSUs. Promoting segment adjacency in the unit selection process leads to a higher segmental quality because it has a positive effect on the average segment length. The average segment length increases slowly with the size of the segment database. This means that lots of data is to be added to the speech segment database in-order to get a significant increase of the average segment length. It is not very practical to rely on the incremental addition of recordings to the segment database to increase the quality of the system. This situation can be circumvented by adding compound speech messages to the speech segment database instead of supplying it with additional recording material.

In one embodiment of the invention, the speech quality of a corpus-based synthesis is enhanced by adding compound speech units to the speech segment database resulting in an increase of the average segment length. This approach offers various advantages which may include that:

- Variation of timbre, pitch and manner of articulation are constrained to the range spanned by the speech unit database. In other words, the range over which the acoustic parameters can vary is invariant to adding compound speech units. This cannot be said about recordings.
- The dependency on recordings and the availability of the speaker become less important for system improvement.
- The segmentation step becomes obsolete, because all segmentation information is intrinsically available in the synthesis output stream.
- This approach differs substantially from the well-known VLBR coders described in literature, mainly because it requires a TTS system in combination with human interaction (acoustic validation process).

The addition of compound speech messages can be done in various different ways. Because the compound speech messages are composed out of segments that are already in the database, no extra acoustic information needs to be added. The compound speech messages can be broken down into a sequence of BSUs. These BSUs can be described by symbolic speech unit feature vectors derived by transplanting the target feature vector description to the compound speech message possibly followed by a hand correction after auditory feedback (done, for example, by a language expert).

The symbolic feature vectors associated with the BSUs are extracted from the hand corrected symbolic feature values. For example, in the phoneme string, primary and secondary stress are automatically obtained through a set of the language modules. Because the language modules are not perfect, and because of pronunciation variation, an extra manual correction step might be required. Therefore this symbolic representation can be quite different from the automatically generated annotation by the grapheme-to-phoneme conversion. However, by transplanting the automatically generated symbolic target feature vectors to the compound messages, the data in the speech segment database and the grapheme-to-phoneme converter will better match. An embodiment of this invention uses automatically annotated compound speech units to achieve a better match between symbolic feature generation in the grapheme-to-phoneme conversion and the symbolic feature vectors used in speech segment database.

Besides expanding the concept of adjacency, the segment database is enriched by new, slightly modified feature vectors through the addition of compound messages to the large segment database. By adding compound messages to the database, only non-acoustic feature values are subjected to a possible modification. For example, the phonetic context, the position of the unit in the sentence or the level of prominence may differ from their original. In this way, variation is added to the segment database without resorting to. new recordings. Non-convex speech unit sequences that are retrieved as convex sequences from the compound utterances have the same advantages as monolithic speech units.

Each speech unit feature vector that belongs to a BSU in the database represents a single point in the multidimensional feature space. By adding speech units from compound utterances to the speech base, one BSU can be represented by an ensemble of points in the multidimensional feature space. Thus adding compound speech units to a speech segment database reduces the data scarcity of that speech segment database. The storage and the use of compound speech units are claimed by the invention.

Database Organization

The addition of many compound speech units to the speech unit database introduces redundancy. The unit feature vector contains linguistic, paralinguistic and acoustic features. The acoustic features remain the same for all unit feature vectors that related to the same BSU waveform. For each CSU, the acoustic features remain the same, and should therefore be stored only once.

Figure 5:
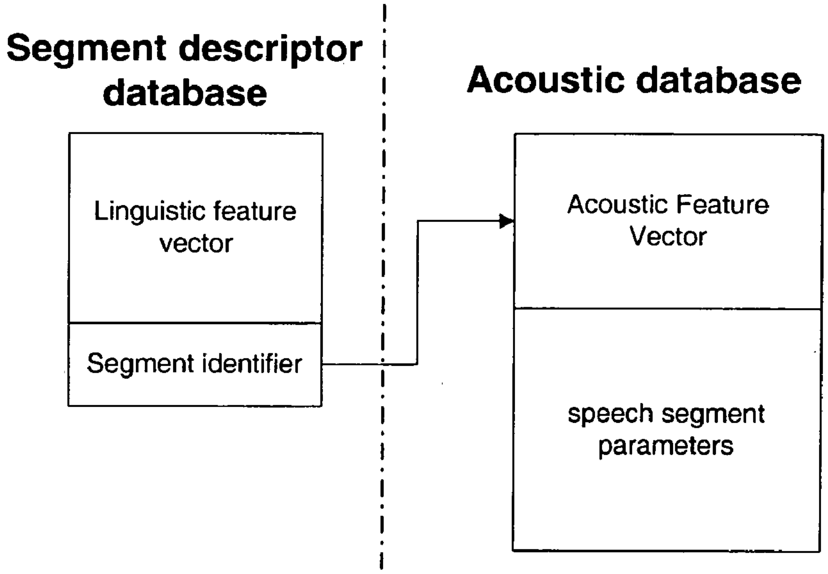
FIG. 5 shows the linguistic as part of the segment descriptor and the acoustic feature vector as part of the acoustic database (after splitting the feature vector).

A separation of the acoustic features from the other features as shown in FIG. 5 results in a more efficient representation of the system into the memory. The two components of the feature vector are the acoustic feature vector and the linguistic feature vector. The linguistic feature vector is linked to the acoustic feature vector and the speech waveform parameters through a segment identifier.

Speech synthesis requires that a speech segment be identified in the linguistic space, the acoustic space and the waveform space. Therefore, the segment identifier might consist out of three parts. In corpus-based synthesis, the segment identifier corresponds typically to a unique index that is used directly or indirectly to address and retrieve the linguistic and acoustic feature vectors and the speech waveform parameters of a given speech segment (BSU). The addressing can for example be done through an intermediate step of consulting address lookup tables.

The use of compound speech units extinguishes the uniqueness concept of the segment identifier because a single acoustic feature vector can be referenced by more than one compound speech unit. To avoid confusion, the segment identifier is now defined as a unique identifier that references directly or indirectly the invariant part of the segment description (i.e. acoustic features if any and waveform parameters). The segment descriptor is defined as the combination of the linguistic feature vector and the segment identifier. The acoustic feature vectors are stored in the acoustic database or in a database that is linked with the acoustic database, while the linguistic feature vectors are stored in the segment descriptor database (that can in some implementation be physically included in the acoustic database).

A segment descriptor contains the linguistic feature vectors and a segment identifier that is or that can be transformed to a pointer to the speech segment representation in the acoustic database. The acoustic feature vector contains among others acoustic features for concatenation cost calculation (such as pitch and mel-cepstrum at the edges) but also features such as average pitch and energy level. The linguistic feature vector includes among other things prominence, boundary strength, stress, phonetic context and position in the phrase. For applications such as dictionary pronunciation systems, linguistic and/or acoustic feature vectors might not be required for the application and can therefore be omitted. Each CSU that corresponds to a given BSU has the same segment identifier.

Figure 4:
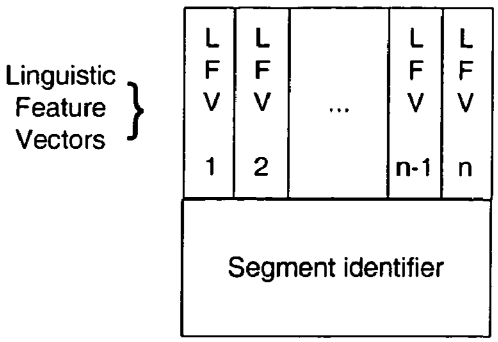
FIG. 4 shows a speech unit descriptor with multiple linguistic feature vectors.

FIG. 4 shows a compact representation of a number of elementary compound speech units that correspond to one BSU. The representation of FIG. 4 shows that only one segment identifier is required to represent all CSUs corresponding to that BSU.

Figure 11:
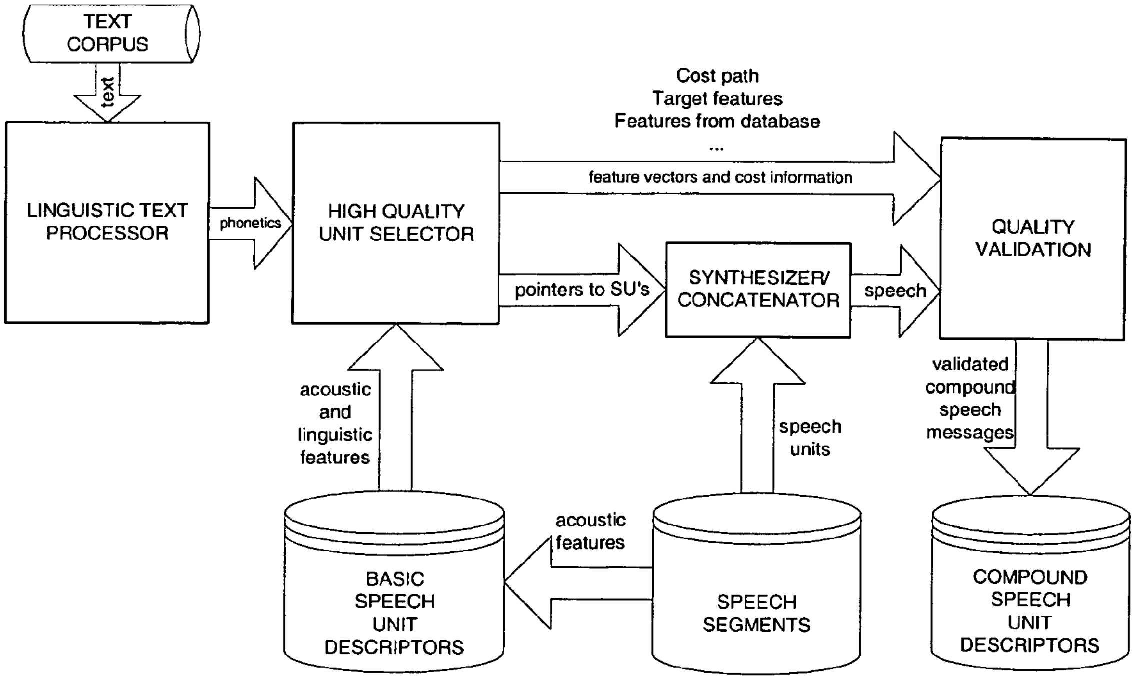
FIG. 11 gives an overview of the compound speech unit training process.
Figure 12:
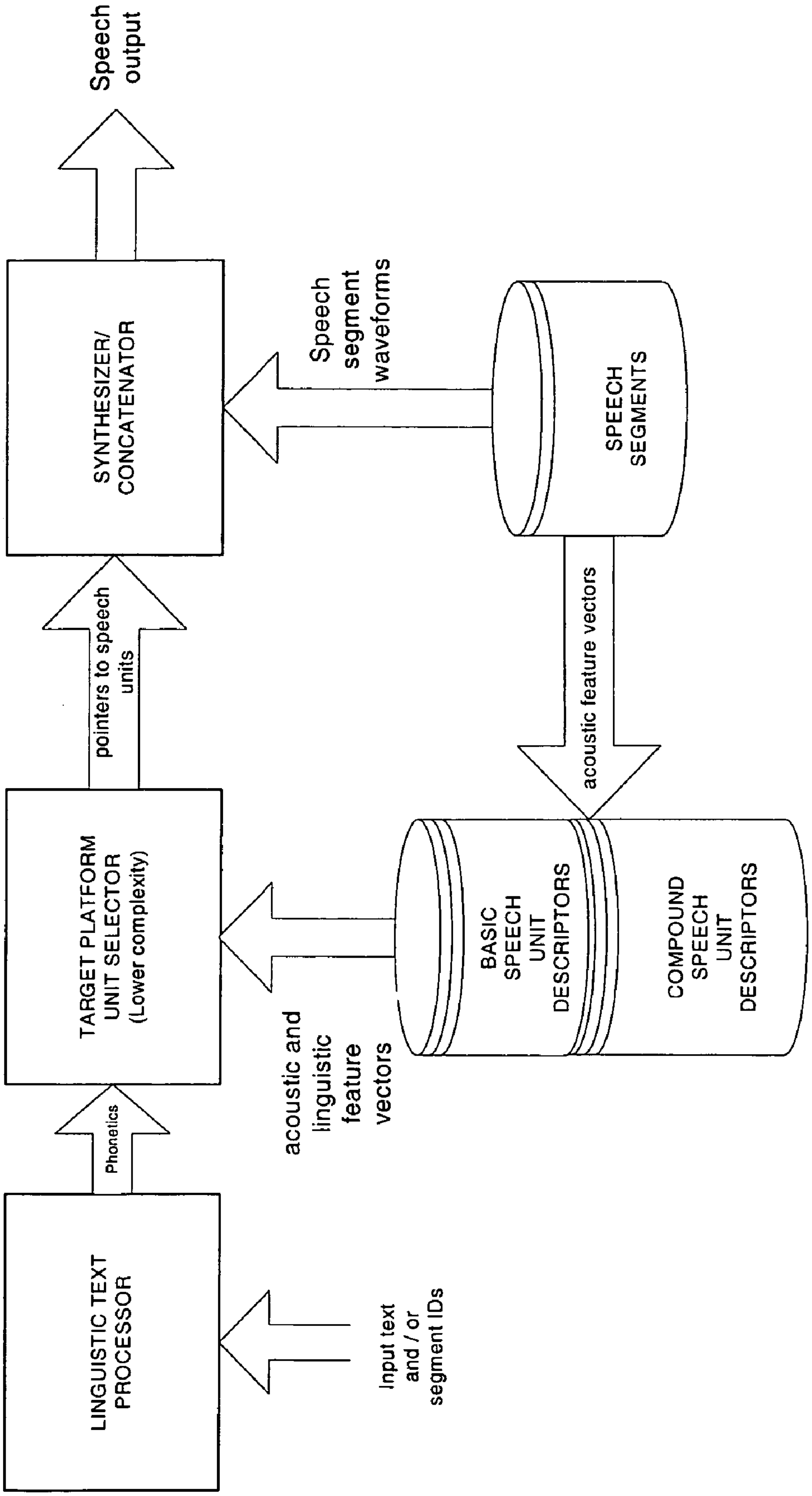
FIG. 12 shows how to use the training results for a corpus-based speech synthesizer on a target platform.
Figure 13:
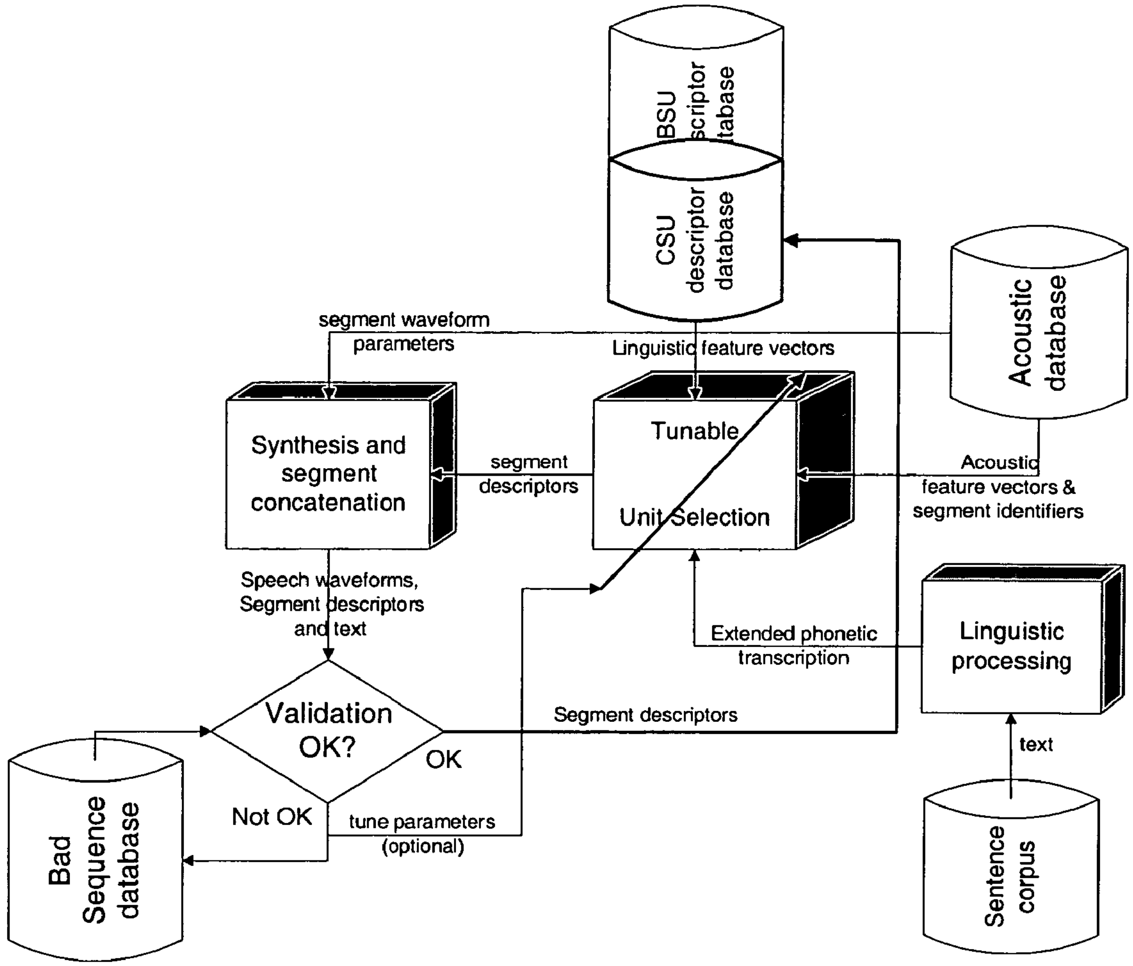
FIG. 13 is a schematic drawing that shows how compound speech units can be added to the compound speech unit descriptor database.

In one embodiment of the invention, a high quality CPU-intensive unit selector (FIG. 11 and FIG. 13) that takes advantage of perceptual measures, is used to generate, based on a large corpus of text material, compound speech messages. It should be noted that the unit selector of FIGS. 11 and 13 can also be implemented as a multitude of elementary unit selectors with different parameter settings or as a sequence of unit selections from which the most appropriate one can be selected, for example, by a validation module. Because an iteration of unit selections sometimes is done, the unit selector shown in FIG. 11 may be made tunable. (The maximum number of tuning iterations is limited to a given threshold.) These unit selection strategies are discussed further in this text. For each sentence that is processed by the unit selector, many different paths through the segment candidates are assessed. Typically the path with the minimal accumulated cost is selected. The normalized cost, the peak cost and the distribution of the cost along the selected path give a first indication on the quality of the synthesized phrase. Based on the path cost and some supra-segmental quality measures that are difficult to integrate in the dynamic programming framework of the unit selector, a selection of the preeminent (best) compound speech messages can be made. If required for the final application, a language expert can further evaluate the machine validated compound speech messages. But neither a validation module nor a manual validation step is required. Some validation tasks also can be incorporated in the unit selection process itself (e.g. transparent concatenation can be verified automatically). The compound speech messages are then decomposed into CSU descriptors that are stored in the CSU descriptor database. The BSU database of the target application can be extended with the CSU descriptor database resulting in an extended database (see FIG. 12). A speech synthesis system running on the target platform (FIG. 12) with possibly a lower complexity (and faster) unit selector can draw on the extended segment database for its unit selection. In this way, lower complexity can be achieved while trying to maintain the same quality as in a more complex unit selector. An extreme but practical example is a speech production system without unit selector that is able to reproduce all recorded messages together with the compound speech messages from the extended speech segment database. This example is discussed later with respect to corpus-based canned speech synthesis.

Use of compound speech units in corpus-based synthesis is a way of training the unit selector by incorporating higher precision perceptual information through data addition. This is somewhat analogous to automatic speech recognition (ASR), where recognition accuracy is increased by training on large corpora of recorded speech. Recorded speech is applied to the ASR system and evaluation and training is done automatically using the known text transcription of the corpus. In the present context of text-to-speech (TTS), text is applied to the speech synthesis system and perceptual evaluation of the generated output speech is required (e.g. by listening) as a feedback training mechanism.

Speech Unit Database Reduction

Embodiments present interesting issues with regards to speech unit database reduction. Besides reduction in database size (making embodiments more suitable for small footprint platforms), the unit selection process can increase in speed as the number of BSU candidates is reduced. For speech unit database reduction, which speech units can be removed from the database needs to be determined in such a way that the degradation is minimal. One way to solve this problem is by using an auditory-motivated distance measure in the feature vector space. But since the feature vector space is of a high dimension, the relationship between the (linguistic) features and the quality is complex and difficult to understand. Therefore it is difficult to construct auditory-motivated distance measures.

As discussed above, after constructing many compound speech units, each BSU can be described by a set of symbolic feature vectors. The level of overlap between the feature sets may be a good measure for the redundancy of the speech units. Besides the level of overlap, the size of the sets can also be used as a measure to indicate the importance of a speech segment.

Constructing CSUs after an initial stage of database creation can immediately enrich the database without making additional recordings, thereby reducing the amount of additional recordings that are required to create a large speech base. Standard database creation relies heavily on efficient text selection to ensure rich coverage of acoustic and symbolic features in the database. Clustering techniques such as vector quantization (VQ) can be applied afterwards to reduce the size of the database without degrading the resulting synthesis quality, basically by removing redundancy that crept into the database during development.

Figure 14:
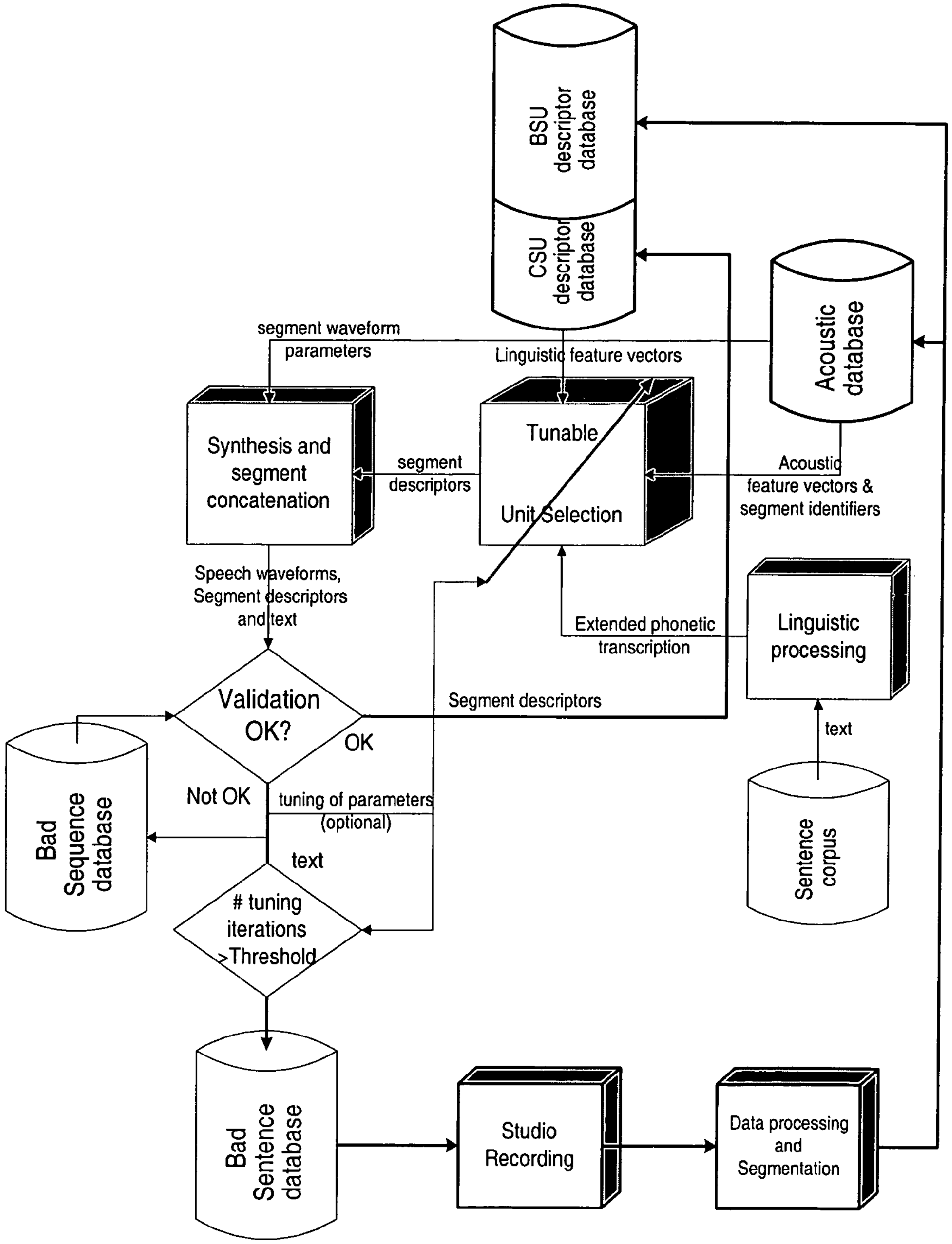
FIG. 14 is a schematic drawing that shows how compound speech units can be used to construct a compact acoustic database.

One proposed framework for database creation (FIG. 14) greatly relies on an iterative cycle of synthesis validation and additions of speech waveform data. The methodology is basically a 3-step approach that is iterated through a number of times:

Based on the target corpus (e.g. a talking dictionary word list), an adequate basic set of words with reasonable phonetic and prosodic coverage is selected and recorded. These are processed and converted into a basic database.

A selection of target words is synthesized using the basic database. These are manually validated.

The feedback from the synthesis validation is used in two ways:

Bad words: Feedback loops back to step 1, i.e. determines which new words/diphones to record next.

Good words: Feedback is used to train the feature weights and functions of the unit selectors to bootstrap better first pass selection in the next iteration, or the validated words are added to the database as CSUs.

An extreme and simplified application of using synthesis feedback consists of listening to target words and adding them to the database as CSU when they have transparent quality. This has several advantages:

Avoiding database redundancy. Currently there is no memory on what segments have been used apart from the complete word, i.e., have the segments been validated before. It would be more efficient to do that at another level and re-using previously validated syllables or word chunks. For example, segmental transcriptions may be used, or validated words can be added to the database (leading to natural re-use of subparts).

Increased consistency in pronunciation.

Generation Of Compound Speech Units

The use of compound speech units in corpus-based speech synthesis can be seen as an exploration/exploitation of the speech unit feature space. The parameter settings that have an influence on the unit selection process limit the space of unit combinations. Several settings of those parameters can be tried out in order to enlarge the space of speech unit combinations and to make more efficient use of the parameter settings.

Composition Procedure

Besides finding an optimal set of features, cost functions, and weights, it is also important to have the right sort of speech data. It could be that the amount of prosodic variation needed is simply not present within an existing speech database. To increase the prosodic coverage of the speech database it might be necessary to first add prosodically rich data to the speech segment database. The new data should be carefully selected to increase prosodic variation while keeping redundancy to a minimum. To ensure variety and naturalness it is better to add continuously recorded messages to the speech segment database. These recordings are more difficult to process, e.g. the automatic segmentation and labeling of the recordings is more difficult because the speech contains more assimilation and more artifacts like clicks and breathing noises.

Output Validation

Validation can help to find synthesis results of transparent quality. The validation corresponds to a good/bad classification of the synthesis results in two distinct partitions based on perceptual measures.

Figure 6:
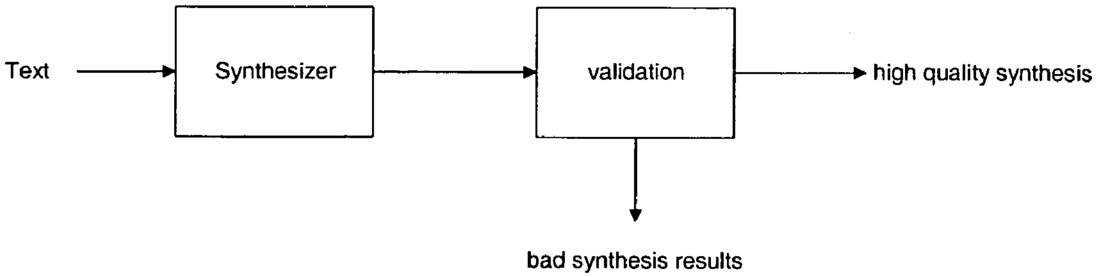
FIG. 6 shows the procedure for simple validation (without feedback).

There are many ways to facilitate the validation process. A semi-automatic validation process where a first machine classification is performed by means of simple segment continuity measures may be followed by a "manual" validation of a smaller set of computer generated utterances. This is the simple validation scheme will be referred to as "simple validation". FIG. 6 shows the process of simple validation. Several variations on how to make the composition process more successful will be further presented.

The Use Of Multiple Unit Selectors

The selected path is a function of the parameters of the unit selector. The unit selector assesses many different paths but only the best one needs to be retained. But other paths besides the chosen one can result in good or even better speech quality. Therefore, it is useful to explore the space of the possible "best" unit sequences by varying the parameters of the unit selector, and to select the best one by listening to it or by using objective supra-segmental quality measures.

In a practical situation, the outputs of N (>1) unit selectors with different parameter settings can be compared, and the best synthesis result chosen (if it is acceptable).

During the validation process several statistics of the costs of the different unit selectors are collected and stored in a training database. This training database can be used to train a classifier that can be used as an automatic validation tool.

Figure 7:
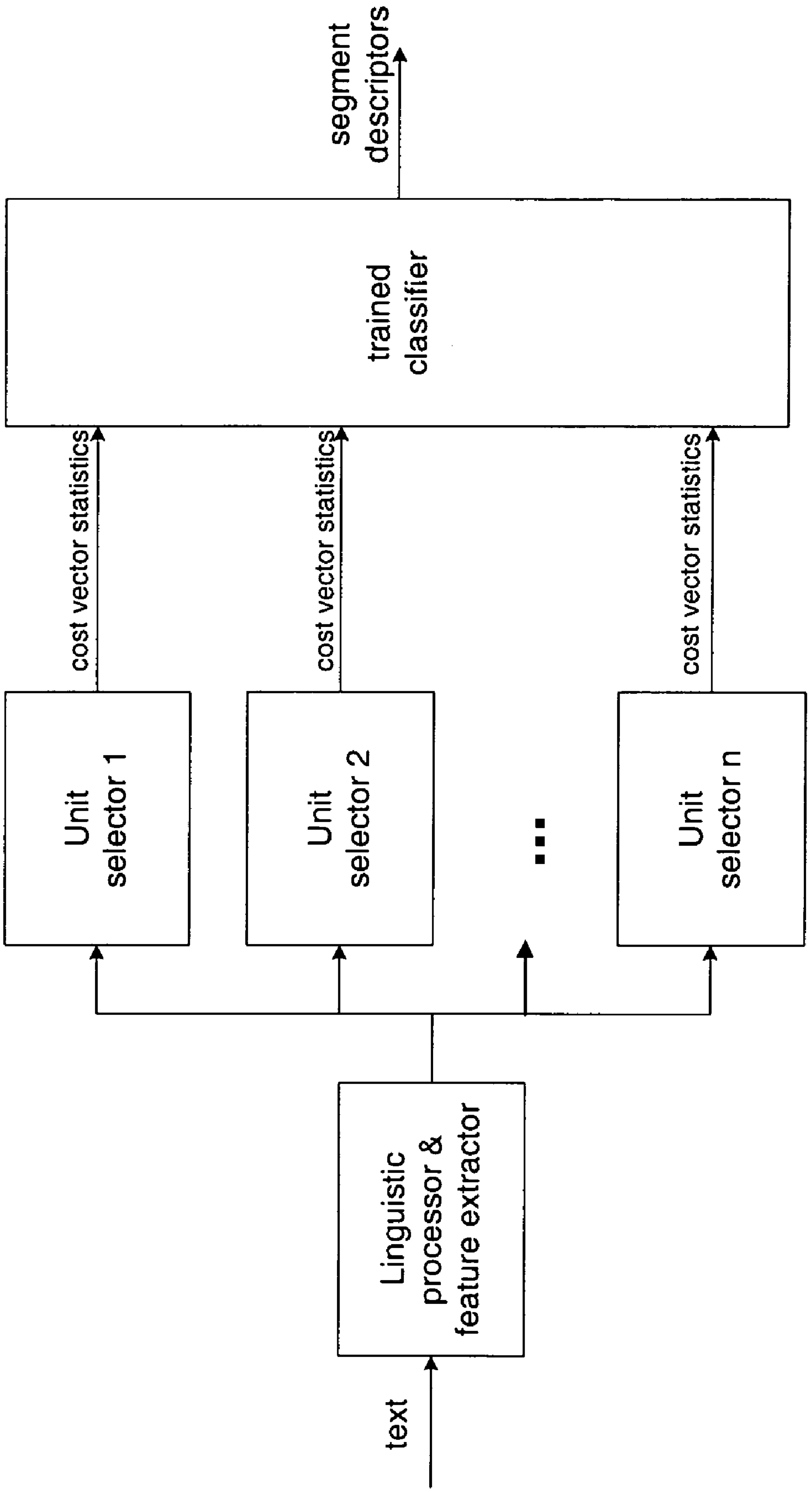
FIG. 7 is a schematic drawing of a multiple unit selector component

In one embodiment, a decision tree, well-known by those familiar with speech technology, is trained on the cost vectors of the unit selectors. The cost vectors are of fixed dimension and contain the accumulated cost and some statistics (such as maximum and average) of the sub-costs of the concatenation costs and the target costs. Other well-known techniques such as neural networks can similarly be used for this task. FIG. 7 shows an example of a multiple unit selector system (after training).

Stochastic Unit Selector

In each candidate list, many segments may share the same target cost value because the symbolic cost function calculation involves a small set of symbolic features. Most symbolic features produce a small set of cost values. Segments with an identical target cost do not necessarily sound equal. It is very likely that different segments with the same target cost will have a different prosodic realization. In the deterministic approach, the differentiation between the segments with equal target cost is done by examining their ability to join to neighboring segments (i.e. concatenation cost calculation). As discussed above, many transitions can't be differentiated either. This means that in an optimal framework where the cost functions are tuned optimally there might be several paths with the same best cumulative cost.

The use of piecewise constant segments in the masking function encourages less differentiation between the candidate segments. It is very likely that (especially for large databases) certain "equally good" paths are not taken into account because the combination of node- and transition-costs are identical. In order to bring more variation in the unit selection process (in order to discover better and more compound messages) probabilities can be introduced at the level of the unit selector.

All cost functions in combination with their masking functions used in traditional unit selectors are monotone rising functions. However, a small increase in cost between different segments does not necessarily mean that there will be an audible degradation of the signal quality.

By introducing a small noise level superimposed on the piece-wise constant (flat) parts of the masking function, the unit selection process will become non-deterministic and will provide variation without audible quality loss. In a further step, some noise can be added to the non-constant parts of the masking function also. In this way a variety of "quasi-equal quality" segment sequences is obtained. The noise level will finally determine if the differences in quality between the best sequence (noise less) and the quasi-optimal sequence will be audible. By controlling the noise level we can obtain variation and produce "equally good" speech unit sequences.

Figure 8:
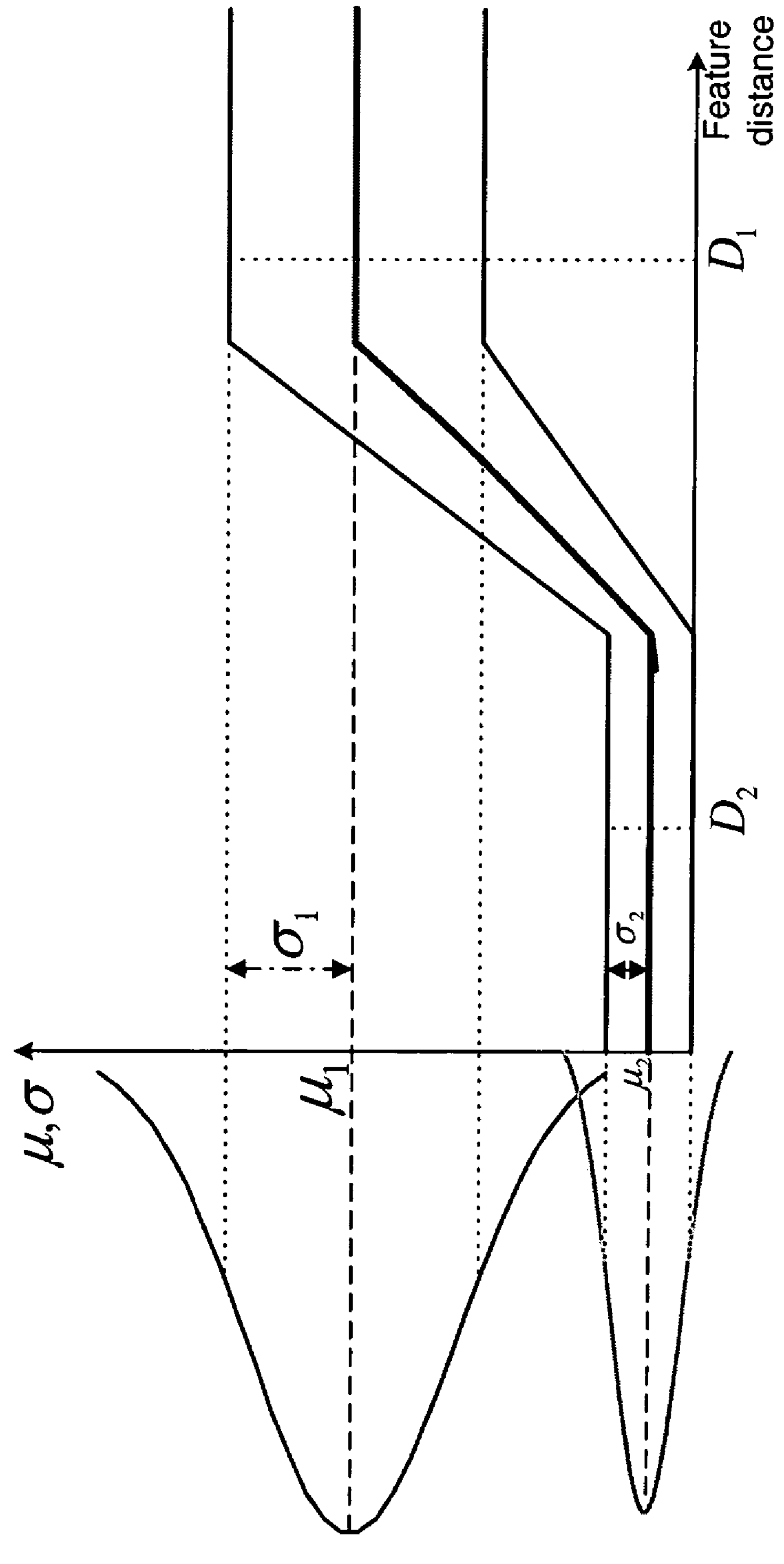
FIG. 8 shows how the parameters for the noise generator that generates the cost for a certain feature is obtained.

Besides using an additive noise level, one can substitute the cost and eventually the masking function with a random generator with a distribution depending on the arguments of the cost function (typically the feature distance) in such a way that the probability density function of the noise generator (described by its mean and variance for example) reflects the penalty (corresponding to the cost) that the developer wants to assign to it. An example is shown in FIG. 8. A feature distance $D_1$ results in a cost generated by a noise generator with mean $\mu_1$ and standard deviation $\sigma_1$, while a feature distance of $D_2$ results in a cost generated by a noise generator with mean $\mu_2$ and standard deviation $\sigma_2$.

The stochastic unit selector can successfully be used in a multi-unit selector framework as described above. However, the stochastic unit selector can also be used in another multi-unit selector framework in which a large number of successive unit selections are done by means of the same stochastic unit selector and where the statistics of the selected units of the successive unit selections are used in order to select the best segment sequence. One embodiment of the invention selects the segment sequence that corresponds with the most frequent units.

Closed Loop Validation (Automatic)

It is difficult to automatically judge if a synthesized utterance sounds natural or not. However it is doable to estimate the audibility of acoustic concatenation artifacts by using acoustic distance measures.

The unit selection framework is strongly non-linear. Small changes of the parameters can lead to a completely different segment selection. In order to increase the synthesis quality for a given input text, some synthesizer parameters can be tuned to the target message by applying a series of small incremental changes of adaptive magnitude. We will call this the closed loop approach.

Figure 9:
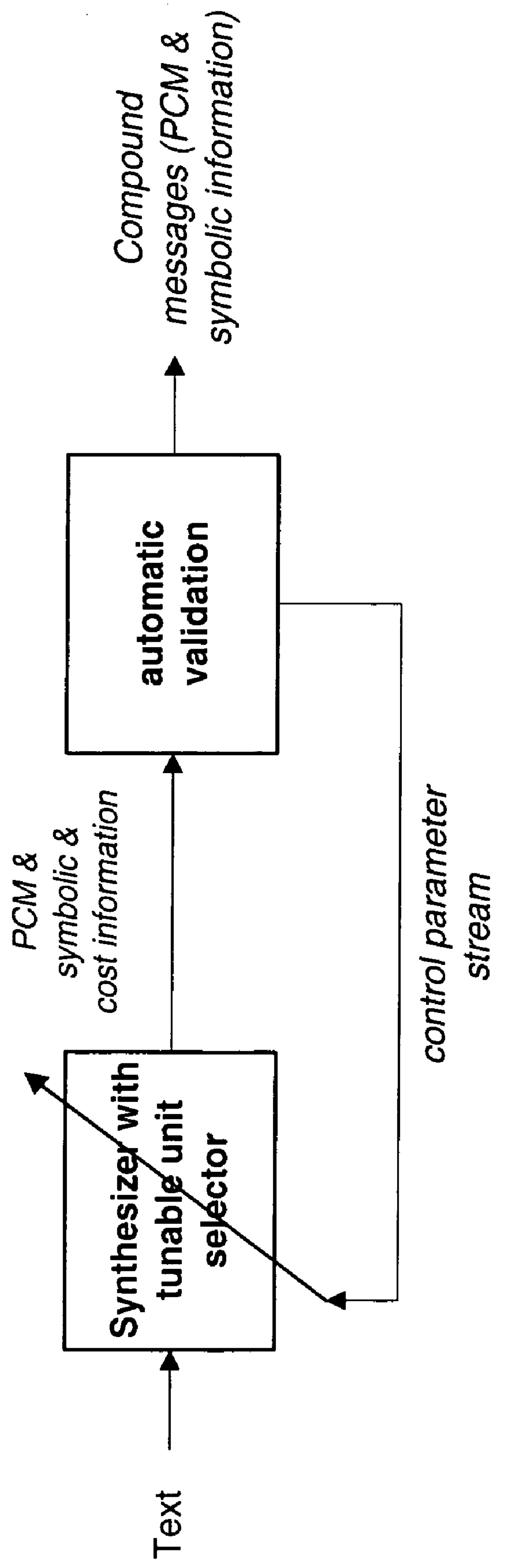
FIG. 9 is a schematic drawing of the automatic closed loop unit selector tuning.
Figure 10:
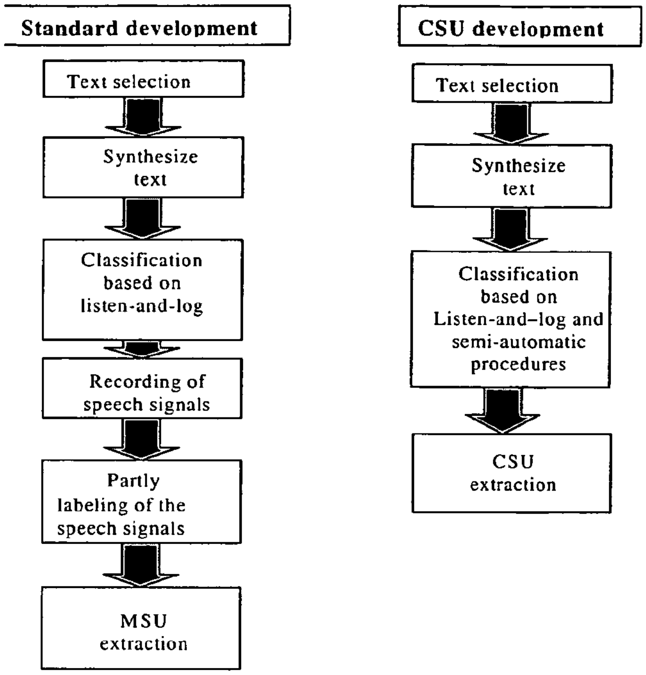
FIG. 10 compares the process of adding new speech units by adding new recordings and the process of adding compound speech messages.

For example, audible discontinuities can be iteratively reduced by increasing the weight on the concatenation costs in small steps over successive synthesis trials until all (or most) acoustic discontinuities fall below the hearing threshold. The adaptation of the synthesizer parameters is done automatically. This scheme is presented in FIG. 9. It should be noted that this approach could be used for on line synthesis too.

In one embodiment of the invention, the one-shot unit selector of a corpus-based synthesizer is replaced by an adaptive unit selector placed in a closed loop. The process consists of an iteration of synthesis attempts in which one or more parameters in the unit selector are adapted in small steps in such a way that speech synthesis gradually improves in quality at each iteration. One drawback of this adaptive approach is that the overall speed of the speech synthesis system decreases Another embodiment of the invention iteratively fine-tunes the unit selector parameters based on the average concatenation cost. The average concatenation cost can be the geometric average, the harmonic average, or any other type of average calculation.

Alternatives To Increase Segmental Variability

A typical corpus-based speech synthesizer synthesizes only one utterance for a given input message. This single synthesis result is than accepted or rejected by means of a binary decision strategy (listener or automatic technique). A rejection of a single synthesis result does not always mean that there is no possible basic speech unit combination for a given input text that could lead to transparent quality. This is mainly because the unit selector is not able to model the real perceptual cost.

As an alternative, the N-best synthesis results can be presented to the classifier (i.e. listener/machine). The N-best synthesis results are found based on the N-best paths trough the candidate speech units in the dynamic programming step. Unfortunately the N-best synthesis results will share many speech unit combinations leading to small variations between the synthesis results.

An efficient approach that results in completely different unit combinations is obtained by a series of N different synthesis phases. The first synthesis phase is accomplished through normal synthesis. In the following phases, some units that were selected in a previous synthesis phase are removed from the unit candidate lists. The selection of the units that are withheld from synthesis in the successive phases is based on the target cost of the remaining units. For example: if the target cost of the other candidate units is unacceptably high then the unit is not removed from the unit candidate list, however if there are remaining units with sufficient low cost, than alternative units can be chosen. In other words we look only for new candidates in the node feature space in the neighborhood of the best units.

It is further possible to automate the selection process if reference recordings are available. The N-best synthesis results can be scored automatically by dynamic time warping them with the reference recording (preferably of the same speaker). The synthesis result with the smallest cumulative path cost is the winner and can eventually be further evaluated in a listening experiment.

Creation Of Compound Utterances By Means Of Dynamic Time Warping (DTW)

This approach starts from recorded speech that is not added to the database but that will be used to select segments based on its acoustic realization only.

The composition algorithm looks as follows:

Create a list of target messages that contain many speech unit combinations that are not covered in the speech unit database. (In a diphone system, this could be triphone, tetraphone, pentaphone . . . units)

Record a set of utterances that contains many of those target messages.

For each recorded utterance do the following:

1. Synthesize the N-best combinations of speech segments for a given target message (see above).
2. Select the best synthesis trial by minimizing the cumulated distance obtained through dynamic time warping between the recorded utterance and the N synthesis results.
3. Perceptual validation of the best synthesis trial (manual or automatic).
4. Update the CSU database if the best synthesis trial is accepted by the validation process.

The "Composition Table": Automatic Unit Composition Based On Concatenation Cost

For a given speech unit database it is possible to construct a speech unit concatenation cost matrix, which we will refer to as a "combination matrix." The number of combinations grows quadratic with the size of the database, extremely large combination matrices are not affordable for speech synthesis. However, a large number (e.g. 500,000) of the most frequent CSUs can be stored (i.e. compound speech units with negligible internal concatenation costs and similar linguistic features at their internal boundaries). If the composition process is calculated off-line, more precise and complex error measures can be used to calculate the perceptual quality of the CSU. It is possible for instance to incorporate the error resulting from the waveform concatenation process into the concatenation cost. High quality speech unit combinations that are not adjacent in the original recording from which they are extracted can be stored in an automatically generated "composition table".

Compound Speech Unit Dictionaries (CSU Dict)

Figure 17:
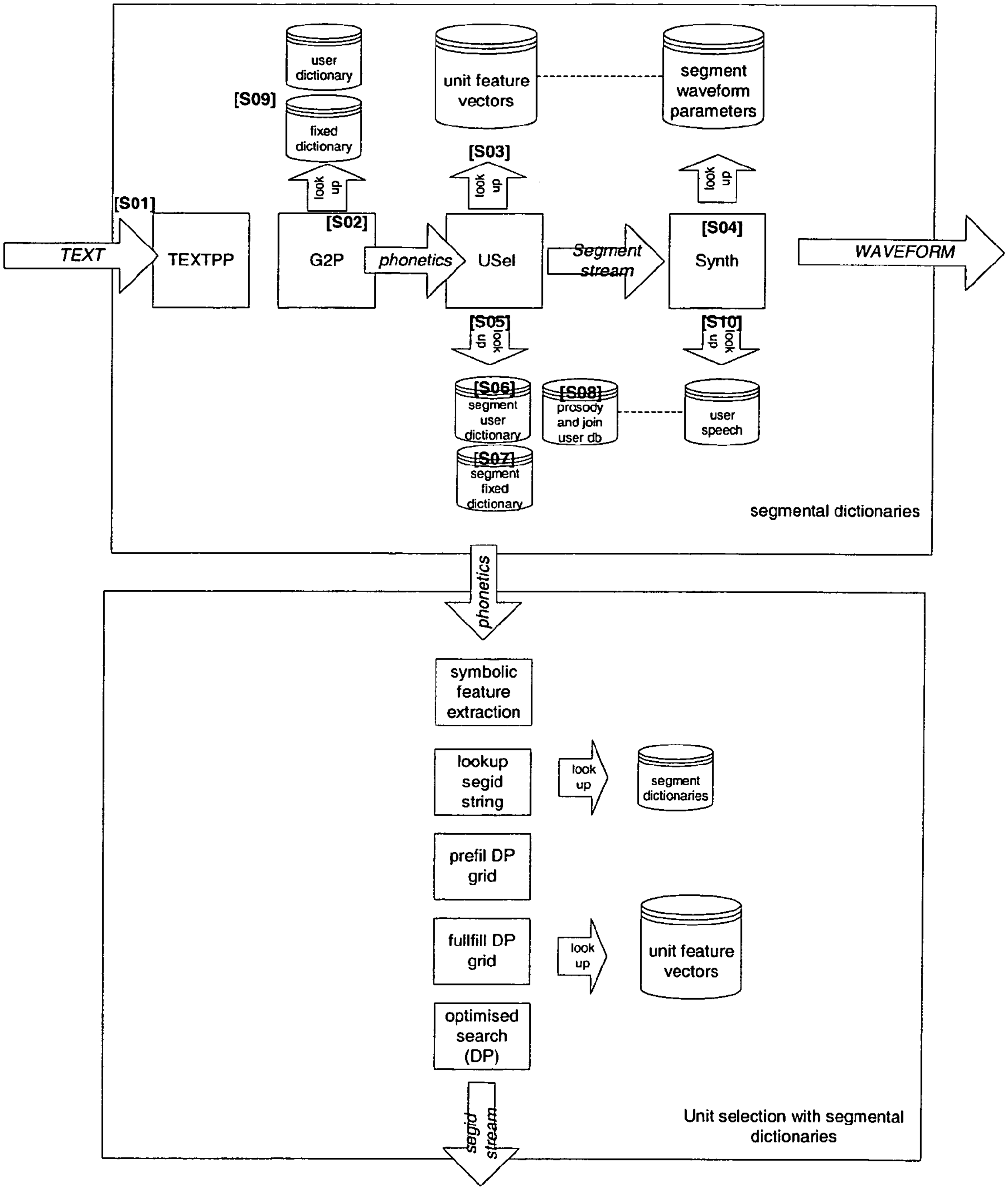
FIG. 17 is a drawing about segmental dictionaries.

The basic flow of a general corpus-based TTS system is shown in FIG. 17. The front-end translates orthographic text into a phonetic transcription. The generation of the phonetic transcription is performed automatically (rule-based system). In addition, fixed lookup dictionaries and user dictionaries are plugged into the system to enhance the quality of the automatic orthographic-to-phonetic translation. The back-end performs a search of optimal matching units from a database given this phonetic transcription. This task is performed by the unit-selector module. The output of the unit selector is a sequence of segment descriptors. The synthesizer fetches the units from the database and performs the concatenation, consequently generating the speech waveform.

The parameters of a unit-selector of a system are tuned towards a general optimal performance given the content of the speech database and the feature set. This general performance reflects the quality of the system. The general optimal performance is therefore sub-optimal for very specific tasks (due to the generalization error), e.g. pronunciation of proper names, city names, high natural sounding speech generation of sentences from which subunits are lacking form the speech database.

To solve this problem one could infinitely add data to the speech database. But that is a sub-optimal solution since it increases the size of the database and is a labor-intensive task (the data needs to be recorded and processed). Also due to generalization of the unit selector, it may not be able to retrieve all newly added data.

Tagging the newly added data as sub-database might help. When encountering this tag, the unit selector performs a dedicated search in a dedicated sub-database. Again, the outcome of the unit selector is not guaranteed, and tagging and adding data still involves a manual task by the speech database developer. A better solution in terms of quality, effort, memory, and processing power is to introduce the principle of segment descriptor lookup and segment descriptor user dictionaries (i.e., a dictionary containing the compound speech units).

This very same principle can be applied to a full TTS system (see FIG. 17). During the database creation process, a fixed segmental dictionary could be made that guarantees or certifies the transparent synthesis of an utterance. In addition the user can construct a segmental database for his dedicated needs. It is important that the segment descriptor is verified in a manual or an automatic way and considered to be a 'good' or of 'transparent' quality.

At run time, the unit-selector consults the segment descriptor dictionary. The segment identifier stream could be preloaded into the dynamic programming grid, if the prosodic and join features are available for the segment descriptors from the segmental dictionary. The dynamic programming algorithm (DP) searches for the optimal solution. Non-linear weights on the segment descriptors from the dictionaries will guarantee a seamless integration of the units retrieved from the dictionary into a new segmental stream. This principle takes it one step further than the standard carrier-slot approach where the carriers are described by means of phonetic streams. If the prosodic and join features are not available for the segments then the unit selector is by-passed and lookup and synthesis can start.

For closed datasets the segment descriptor dictionary can be accessed immediately from the orthography thereby replacing both the grapheme-to-phoneme conversion and the unit selector module. Homographs must be tagged correctly then.

Corpus-Based Canned Speech Synthesizer

There are some analogies between the use of compound speech units and canned speech synthesis. In one embodiment of the invention, aspects of canned speech synthesis and corpus-based speech synthesis systems are combined to create a corpus-based canned speech synthesis system that can easily be extended and changed by the user without falling back on extra recordings. Just like carrier-slot applications, it helps to fill the gap between the traditional canned speech synthesis applications and corpus-based synthesis approach. The basic speech unit may be "small" (e.g. diphone) such as in traditional corpus-based synthesis.

A single prototype speech segment may be used as a building block to generate a number of different speech messages. On average, one prototype speech segment may be used in the construction of more than one speech message. In order to generate speech, the corpus-based canned speech synthesizer accesses a large prosodically-rich database of small speech segments. In order to find the right speech segments, the corpus-based canned speech synthesizer utilizes a database of segment identifier sequences that can be interpreted as a compressed representation of the messages to be synthesized.

The selection of the speech segments is done off-line by means of a unit selector that acts on the same segment database, preferably assisted by a listener who fine-tunes and validates output speech messages. However, as mentioned before, the validation process can also be done automatically or can be assisted by an automatic means.

The optimal sequence of segment identifiers is stored in a database that can be consulted by the synthesis application or system in order to reproduce the output speech message. For each target segment, the segment database contains many prototypes (candidates) covering many different prosodic realizations, enabling the listener to synthesize many different realizations of the same utterance by, for example, fine-tuning or iterating through the N-best list of the unit selector. Embodiments can also be used in combination with unrestricted-input corpus-based speech synthesis in order to enhance shortcomings of the system or to improve on a certain application domains (e.g. pronunciation of words for language learning etc.)

Another embodiment of the invention consists of a prosodically-rich speech segment database containing a large number of small speech segments (such as diphones and demi-phones etc.), a lookup device and a number of lookup tables that enable speech segment retrieval, and a synthesizer that is capable of concatenating speech segments producing speech waveform messages. Each message that has to be synthesized is encoded as an entry in one or more databases in the form of a sequence of one or more segment identifiers. This non-empty sequence of segment identifiers is called a segmental transcription (in analogy to a phonetic transcription). The segmental transcription is than used by the lookup engine to sequentially retrieve the segments to be concatenated.

In one specific embodiment, the speech segments are encoded and stored as a sequence of parameters of different types. This means that the speech segment retrieval process includes a speech decoder. The process of encoding and decoding of speech waveforms is well known and understood by those familiar with the art of speech processing.

Once the complete speech database has been created, the incremental bit-rate to represent additional speech messages will be very low, and will be mainly determined by the number of bits required to represent the segment identifiers. The word size of the segment identifier is, among other things, dependent on the size of the database. However by taking into account that not all pairs of speech units can be joined together, the bit rate can be further decreased. For example, in the case of diphones, only segments ending and starting with the same phoneme may be joined. By partitioning the set of all diphone segments into classes corresponding to their first phoneme, the segment identifiers can be represented more efficiently.

Because the average length of the variable size units that are created by selecting adjacent speech segments is significantly larger than the length of a basic speech segment from the large prosodic rich segment database, the residual bit rate can be further reduced by applying a run-length encoding technique by ordering the segment identifiers naturally as they occur in the segment database and encoding the segmental transcription as a sequence of couples of segment identifiers and number of adjacent segments. Because of the low bit-rate representation, applications such as talking dictionary systems in which mainly words, compound words, and short phrases are synthesized on low-end platforms, are particularly suited for this synthesis method.

Figure 15:
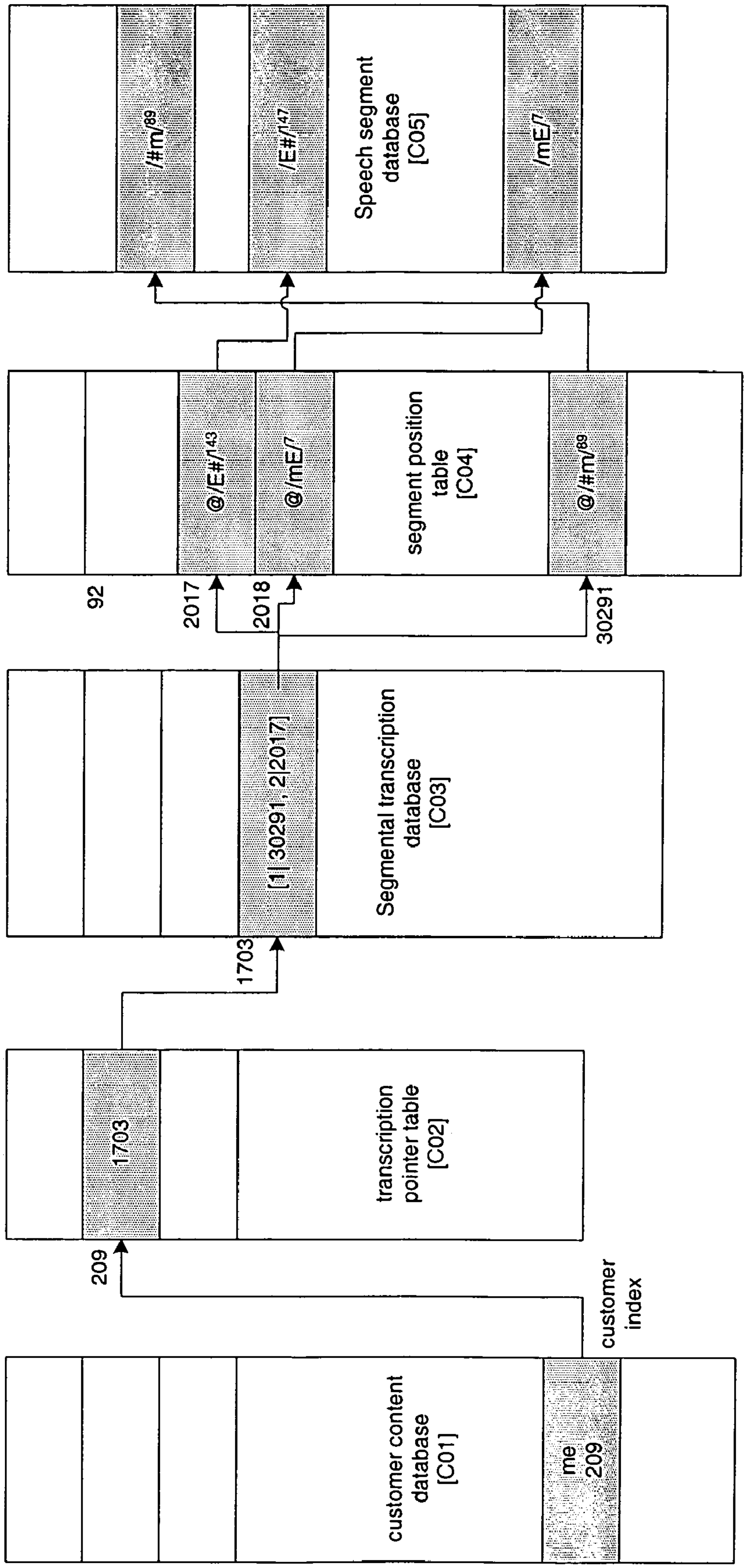
FIG. 15 gives an overview of various important databases and lookup tables used in the canned speech synthesizer, illustrating synthesis of the phonetic word/#mE#/by means of diphones.

FIG. 15 gives a more detailed overview of the tables and databases used in an embodiment of the invention. The customer content database C01 is managed and owned entirely by the customer. In the case of a talking dictionary system, it can contain, for example, the orthographic transcriptions of the messages to be spoken, their phonetic transcriptions, and possibly an explanation of the message. For each entry of the customer content database C01 that requires a speech prompt, an appropriate index is provided. It is the task of the customer to supply this index to the speech generation software function in order to produce the speech messages.

A tool that creates in response to some user actions (e.g. repeated validation), segmental transcriptions for entries that need a speech prompt may be provided to the customer. With the aid of this tool, the customer can generate speech messages and segmental transcriptions through a corpus-based synthesis technique that selects its units from a database that is identical to the database used on the target application. This guarantees the same speech quality as if the message was generated by the target application by using the same segmental transcription.

Figure 19:
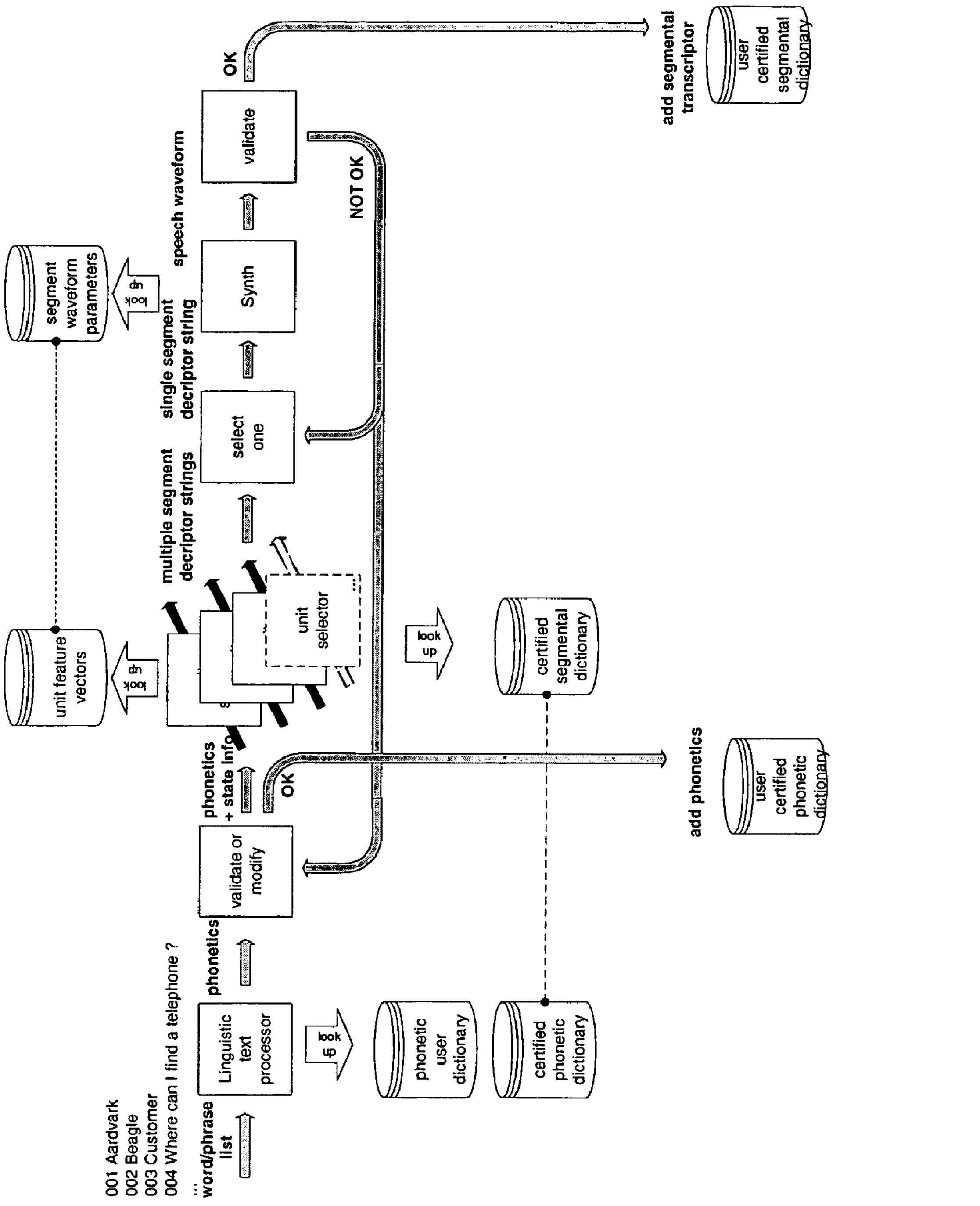
FIG. 19 is a schematic diagram of the GUI-based RSW user tool to build a dictionary of compound speech units.

In order to generate the highest possible speech quality (higher than the speech that can be derived from a standard corpus-based synthesizer), the unit selection process may be fine tuned or a list of alternative message generations may be considered. The phonetic input string may also be modified (e.g., accentuation, pause, and/or tuning of phonetics for specific names, etc.). The phonetic string can be provided automatically by the grapheme-to-phoneme module, or it can be retrieved from a dictionary. The best speech message can then be selected from a set of relevant candidates and the segment descriptors of this message can be retained in a separate database called a "Customer Certified Database". The customer certified database can be loaded into a TTS system (see principle compound speech units dictionary, CSUDict.) or the RSW system or into the customer tool itself which is explained in more detail in FIG. 19.

The transcription pointer table C02 (FIG. 15) is a linear lookup table that translates the customer index to the start position (the field length is fixed to say N bits) of the segmental transcription in the segmental transcription database C03 (FIG. 15) and the length of the segmental transcription (also fixed field length). As the field length.N is fixed, the table can be addressed through linear indexing. The function CP(n) indicates the transcription pointer of customer index n and L(n) as the length of the coded segmental transcription. If the speech segment database C05 (FIG. 15) is organized so that consecutive entries are stored consecutively, the following equality applies: $CP(n+1)=CP(n)+L(n)-1$. This ordering eliminates the need to store the length of the segmental transcription. Transcription pointer table C02 (FIG. 15) can be further compressed by partitioning the table into several groups where each group is represented by an offset, and the position of each element in such a group can be calculated by taking the cumulative sum of the length fields.

For example a partitioning in groups of four entries would result in a coding gain at the expense of an average of 1.5 additions per access. This must be compared to 1 subtraction that is needed if only positions were stored. The indices stored in customer database C01 (FIG. 15) could also be directly replaced by the codes stored in the transcription pointer table C02 (FIG. 15). This has the drawback that it leads to a direct and thus stronger coupling of the customer content database with our encoded content database. It may limit flexibility for future adaptations.

The segmental transcription database C03 (FIG. 15) contains the encoded segmental transcription of the messages to be spoken by the system. The storage of the segmental transcription can be done in different ways. We can take advantage of the fact that the synthesis speech waveform typically contains subsequent segments that are adjacent in the segment database (i.e. original recording). Because the average number of adjacent speech units is typically larger than two, an old fashioned but very efficient run-length code can be used to represent the segmental transcription. The segment transcription database C03 (FIG. 15) can be further reduced by using sequences of virtual segment identifiers that correspond to frequently used sub-strings found in the segmental transcription database C03 (FIG. 15) (in analogy with compound speech units).

The virtual segment identifiers are ordered appropriately and are then appended sequentially to the segment position table C04 of FIG. 15 so that their ordering corresponds to their ordering in the frequent sub-strings. Then the frequently used sub-strings are replaced by the appended sub-strings of segment identifiers. The run-length codes further compress the substituted segmental transcriptions. Such virtual segment identifiers point to segments that are already pointed at by real segment identifiers.

The segment position table C04 (FIG. 15) translates the segment identifiers to the start position of the corresponding speech segment in the speech segment database C05 (FIG. 15) that contains the coded speech waveforms of all the speech segments that are maintained. The speech can be encoded through source-tract decomposition, which is well suited for natural sounding prosody modification within certain ranges. Besides the coded speech parameters, each encoded segment has a segment information header containing the size of the segment and some basic coding parameters.

Such an encoding scheme allows for flexible speech compression that can deviate from the typical frame-based approach, resulting in a much higher coding gain. This approach also allows for the use of independent prosodic and spectral prototypes, which might further decrease the size of the speech segment database. Efficient coding schemes such as VQ and piece-wise linear compression can be used and may require extra tables that are not shown in FIG. 15, but which are well known by those familiar with the art of speech signal processing.

Figure 20:
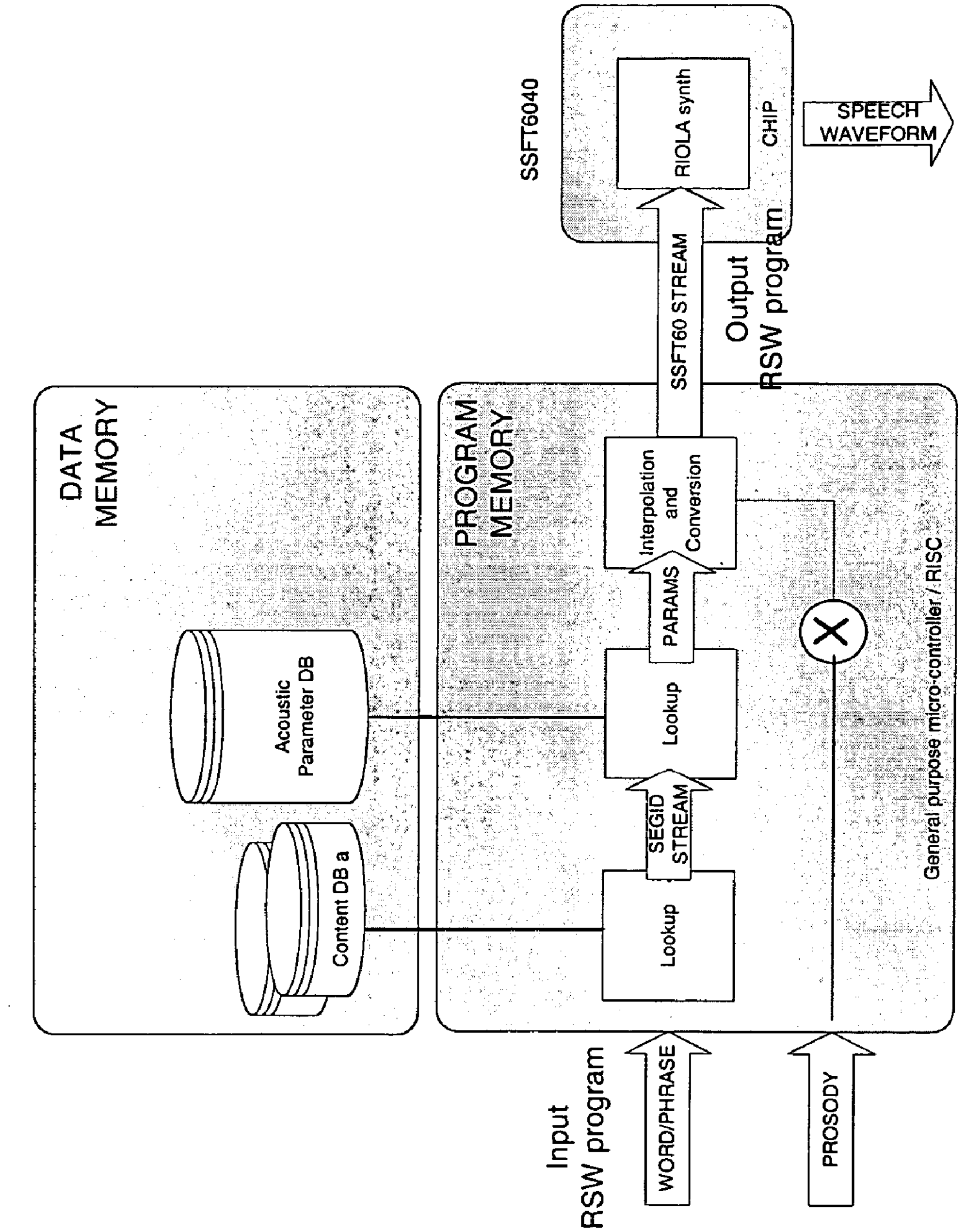
FIG. 20 depicts the realization of a talking dictionary system on a dual processor system (general μ-proc and dedicated SSFT6040 chip).

FIG. 20 shows the implementation of the corpus based canned speech synthesizer (e.g. talking dictionary device) on a dual processor system. The databases are stored in data ROM memory, while the code resides in program memory (also ROM). The RAM requirements are very low. The content database can be created by the customer by means of the RealSpeak word user tool (FIG. 19) to create and fine-tune optimized speech synthesis. This provides the customer full flexibility for creating his application. The computational resources of the segment generation process are very low so that the segment extraction can run on a slow general-purpose microprocessor such as the Z-80 (<1 MIPS). The more computational expensive synthesis part (RIOLA synthesis) runs on a dedicated masked microchip. RIOLA stands for Reduced Impulse length Over Lap and Add. RIOLA synthesis is a new high-quality pitch-synchronous parametric (pulse excited LPC) speech synthesis method implemented in an overlap-and-add framework. For each pitch period, a fixed length impulse response is generated based on a set of filter parameters. Typically an all-pole filter is used for that (but ARMA filters can also be used). The filter parameters are best derived by means of a pitch synchronous speech analysis process (e.g. pitch synchronous LPC). A synthetic pulse is used as excitation signal (e.g. DC compensated dirac-pulse or Zinc pulse). The length of the impulse response generated for a given pitch period is equal to or exceeds the number of samples of one pitch period. RIOLA uses substantial damping of the impulse response in the overlap zone, which is beneficial for the quality (better energy control, less buzziness/metallic, more natural synthesized speech, larger modification factors). The overlap zone of a given impulse response starts at the sample moment on which the next impulse response will be generated (i.e. one pitch period further). In the overlap zone, the damped impulse response tail of period $j-1$ is added to the impulse response of period j. (i.e. case overlap zone <=pitch period). When the overlap zone exceeds one pitch period, the more damped impulse responses coming from pitch period $j-2$ etc. have to be added. The overlap zone can generally be kept quite small (order of one pitch period) which is beneficial for the CPU load.

Distributed TTS System

Figure 16:
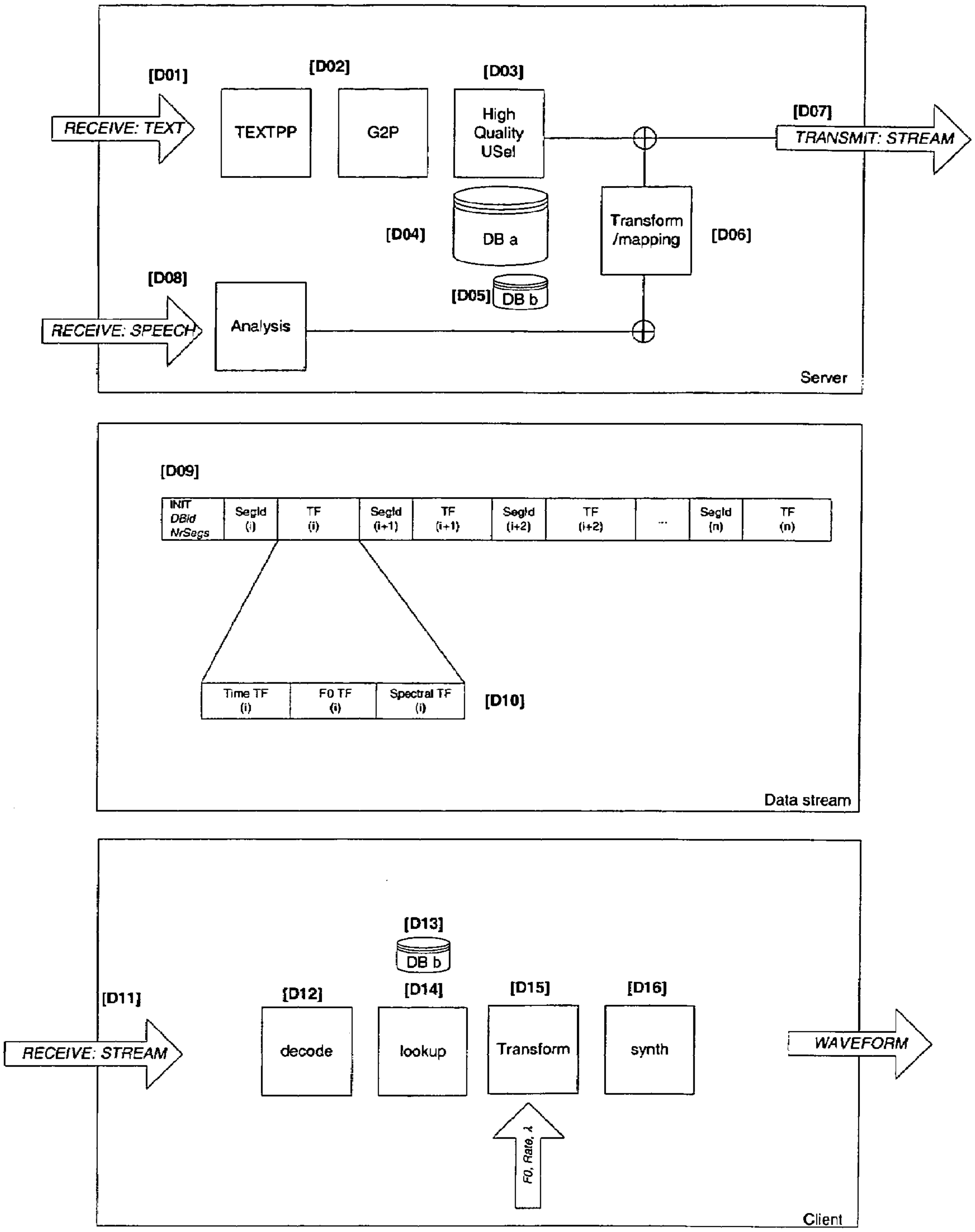
FIG. 16 shows the components and the data stream of a distributed speech synthesizer.

Embodiments of the current invention can also be used for a distributed TTS system in which the segment identifier stream is generated on one platform (server platform) and transmitted to another platform (e.g. client platform) where the units are retrieved from a parametric speech database and converted into a speech waveform (see FIG. 16).

The server platform receives a text input [D01]. The text is properly converted to a phonetic string by a text preprocessor and a grapheme-to-phoneme conversion module [D02]. A high quality unit selector searches the optimal sequence of units from either a large database [D04] or a small database [D05]. When the large database is used, the transformation-mapping module maps the segments to the small database [D06]. This provides the flexibility to upgrade the database on the server while maintaining the client (embedded device) as such.

To increase variety (e.g., by voice transformation or prosody transplantation) speech can be input and aligned with the text to the server. The transformation unit generates the transformation parameters [D10] for the sequence of segment identifiers that is closest to the prosody of the donor speech (search for possible minimal manipulation). In the specific case of pure segment mapping, the transformation parameters are also generated where needed.

The transmitted data stream [D09] contains (next to a control protocol) an initialization code containing a database identifier (DBid), the number of segment identifiers and transformation parameters that are in the stream (nSegs), a sequence of segment identifiers Segid(1 . . . nSegs), and a series of transformation parameters TF(1 . . . nSegs) aligned with the segment identifiers. The transformation parameters consist of a time manipulation sequence (Time TF), a fundamental frequency manipulation sequence (F0 TF), and a spectral manipulation sequence (Spectral TF) [D10]. Not all transformation parameters need to be generated for this system; in other words, the transmitted data stream can be as simple as just a sequence of segment identifiers with empty transformation parameters.

The client platform receives the transmitted data stream [D11] and decodes [D12] it. The speech parameters are retrieved from the embedded database [D13] by means of an indexation scheme based on the segment identifiers. If the segment aligned transformation parameters are available, the speech parameters are transformed. This transformation can be rate, pitch, and/or spectral manipulation. Next to that, the user of the client can apply a message-wide transformation of pitch (F0), rate and spectrum (λ), If specified, these transformation parameters are applied to all segments of the message. Finally, the speech parameters are converted into waveforms [D14] and concatenated in order to generate the output speech waveform.

Possible applications include a TTS system to read back data from RDS-receivers, a TTS system to read back traffic messages, a TTS system to read back speech in radio controlled toys etc..

Acoustically Compound Speech Units: Beyond The Acoustic Barrier

Currently, segment resequencing systems convey a more human-sounding synthesized speech than other type of synthesizers because of the intrinsic segmental quality and variability; but they demand more computational resources in terms of processing power and storage capacity and offer less flexibility. The degree of flexibility to modify the default speech output in concatenative systems depends on the availability and scope of signal manipulation techniques. In concatenative speech synthesis, the degradation of the speech quality is typically correlated with the amount of prosody modification applied to the speech signals.

Corpus-based speech synthesis draws on large prosodically-rich speech segment databases. Many of those speech segments sound similar and vary only slightly in some parameters. For example, several BSUs will have a similar spectral trajectory and differ substantially in prosody while other BSUs that have substantially different spectral trajectories will have similar pitch, duration, or energy contours. BSUs that have all acoustic parameters alike are redundant and can be replaced by a CSU where after the original waveform parameters are removed from the speech segment database. Because one or more acoustic parameters often show resemblance, it is possible to enlarge the compound speech unit concept to acoustic parameters also.

Two speech segments (first and second) are acoustically similar if the first segment can be modified with no perceptual quality loss by means of prosody transplantation/modification techniques (well known by those familiar in the art of speech processing), resulting in a new (third) speech segment that sounds like the second segment. Searching acoustically similar speech segments can be done by dynamic time warping, a technique well known in the art of speech processing. The acoustic similarity measure can be used to reduce the size of the database.

The optimization problem of finding the speech segments that create the maximum reduction in the speech waveform database can be done through vector quantization (clustering), also well known in the art of speech processing. The term acoustically compound speech unit (ACSU) will be used to refer to speech unit representations that share an incomplete acoustic representation. In other words, a set of ACSUs refers to a common acoustic representation that does not entirely describe the acoustics of the speech unit.

Each ACSU representation of that set of ACSUs embeds some segment-specific acoustic information (e.g. pitch track, energy contour, rate contour) that is complementary to the common acoustic information. The segment-specific acoustic information differentiates the ACSU from other ACSUs of that set. In order to reconstruct an ACSU, the warping path, the intonation and energy contour, and a reference to the speech waveform parameters need to be stored and consulted at synthesis time. The introduction of ACSUs requires that the speech segment database be organized differently. An embodiment of the invention uses a multi-prosodic representation as shown in Table 2. In this representation, all acoustically similar segments are represented by a common description followed by the differentiating elements.

The warping path, which is typically frame oriented, defines a discrete spectral mapping function from one speech segment to another. In practice, the warping path is a monotonically increasing function of the frame index. Under this condition, the warping path can be represented as a repeat vector indicating how frequently a given frame must be repeated. The spectral repeat vector indicates the frame indices where the spectral vectors are to be updated. The number of spectral vectors in a diphone will always be less than or equal to the number of frames. This is because there is variable frame length coding of the spectrum; i.e., similar spectra are not repeated. Also for all different prosodic realizations the same spectral vectors are used but they can be used at different time positions.

For each redundant speech segment, a pitch track and a time warping contour may be stored in place. The pitch track can be stored efficiently as a sequence of breakpoints that represents a piece-wise linear pitch contour (preferably in the log domain). The time warping contour non-linearly maps the time scale of a basis segment to the time scale of the "redundant" segment. The time warp contour is monotonically increasing and can be stored differentially.

There are at least two options for the encoding of the spectral parameters. The simplest method is to take over the entire spectral trajectory of the corresponding basis segment. In order to avoid altering the perception of the segments, conservative measures should be used. However, a larger coding gain can be expected if the differences between the basis segment and the "redundant" segment are stored. In the latter case, the number of basis segments will be smaller.

TABLE 2

| Building blocks | Content | Representation | Example |
|---|---|---|---|
| Spectral trajectory | Number of spectral vectors | $N_s$ | 3 |
| | Spectral vector representation | $S_1, S_2, \ldots, S_{N_s}$ | $S_1, S_2, S_3$ |
| Prosody header | Number of prosodic realizations | $N_P$ | 2 |
| | Offsets for each of the $N_P$ representations | | [@segment1, @segment2] |
| Segment 1 | Number of frames in this prosodic realization | $N_f$ | 8 |
| | Spectral repeat vector | $R = [r_1, r_2, \ldots, r_{N_f}]$ | [101001000] |
| | Voicing information [initial status; final status; break position \|\| exception code] | | [1, 1] |
| | Pitch block == [breakpoint vector; pitch data] | | [11000100]; [200 5.8 −3.2] |
| | Energy block == [breakpoint vector, pitch data] | | . . . |
| Segment 2 | Idem | | . . . |
| . | . | | . |
| . | . | | . |
| . | . | | . |
| Segment $N_p$ | Idem | | . . . |

The spectral trajectory represents a number of spectral vectors $S_i$ (such as LPC or LSP vectors, possibly enriched with some excitation information such as a coded residual signal) that allows reconstruction of the spectral trajectory of the speech segment. The number of spectral vectors $N_s$ used for the spectral vector representation is smaller than or equal to the actual size of the speech segment expressed in vectors. This is because the spectral vectors are determined through a technique called variable frame rate coding where similar consecutive spectral vectors are replaced by a single spectral vector, well known in the art of speech processing. The reconstruction of the real spectral trajectory in the time domain is done by means of the spectral repeat-vector.

The spectral repeat vector represents the frame indices where spectral vector updates are required. The synthesizer can use the spectral vectors as they are or it can interpolate between the updated spectral vectors to smooth the spectral trajectory. The length of the spectral repeat vector is related to the total number of frames of the speech segment. The spectral repeat vector R contains only binary elements. For example a "0"-symbol for $r_i$ means no spectral update required at frame index i while a "1 "-symbol for $r_i$ means that a spectral update is required at frame index i. The number of spectral vectors in a diphone will always be less than or equal to the number of frames. This is because variable frame length coding of the spectrum is used; i.e., similar spectra are not repeated. Also for all different prosodic realizations the same spectral vectors are used at possibly different time positions.

So assuming $N_s$=4 and $N_f$=8, then the spectral repeat vector [10011010] means spectral vector 1 is used for frame indices 1, 2 and 3; spectral vector 2 is used for frame index 4; spectral vector 3 is used for frame indices 5 and 6; spectral vector 4 is used for frame indices 7 and 8 (the spectral repeat vector is at least of length $N_s$ so $N_f$>=$N_s$). This means that in this described implementation we cannot produce speech segments that are shorter than $N_s$ frames. This is a limitation that should be taken into account during the clustering process, however it is straightforward for those familiar with the art of speech or information processing to create other data structures that allow shortening.

The voicing information is coded under the assumption that most BSUs have none or only 1 change in voicing status. So the information can be fit in 1 bit for the initial voicing status, and in 1 bit for the final voicing status. If the two voicing states are different, then another code is needed to indicate the position of the spectral vector where the change takes place. The voicing decision is attached to a spectral vector. In exceptional cases, a code must be provided to encode a double change in voicing status within a segment (e.g. diphone).

The pitch block is a piecewise linear approximation of the intonation contour of the segment. It consists of a (binary) breakpoint vector P (e.g., P=[$p_1$, $p_2$, . . . , $p_n$]=[1100101100]) indicating the frame positions in the voiced regions of the breakpoints followed by the pitch data at the breakpoints. The pitch data is a sequence of pitch values and pitch slope values represented at a certain precision and preferably defined in the log-domain (e.g. semi-tones). The pitch slope values represent pitch increments that have a precision that is typically higher than the precision of the pitch values themselves (because of the cumulative calculations).

A "0"-symbol for $p_j$ means that there is no update at frame index j while a "1"-symbol for $p_j$ indicates an update of the pitch data. An isolated breakpoint at position j ([. . . 010. . . ], i.e. a "1"-symbol surrounded at each side by at least one "0"-symbol) indicates an update of the slope value for the pitch for the j-th voiced frame. Two or more (say N) subsequent breakpoints (e.g. [. . . 01110. . . ] indicate that the pitch value will be updated at N−1 consecutive frames, followed by a slope value corresponding to the N-th "1"-symbol. The energy block is similarly represented as the pitch block.

If "read-all" philosophy is used, $N_p$−1 bytes can be stored to find the correct offset for each realization. If "read-selective" philosophy is used, then one could argue to store $N_p$ bytes, as not only the offset but also the length must be known. On the other hand storing $N_p$−1 bytes can be enough in a "read-selective" philosophy too, provided that a maximum size of a prosodic realization is known so that enough information can be read to decode the last prosodic realization in cases this is requested. This saves 1 byte for every spectral realization. The trade-off depends on the ratio of the average versus the maximal size of a prosodic realization as well as the frequency of use, i.e., how often will the system need access to a last prosodic realization (or the number of prosodic realizations per spectral realization).

Prosody Modification

To go beyond the prosodic variety that the speech database can provide, prosody modification can be used. Other components such as the unit selector can benefit from the introduction of prosody modification (even for small levels). Prosody modification in the form of segment boundary smoothing allows relaxing the continuity constraints used in the unit selector. Prosody modification can also be used to imply a prosody contour on the synthesized speech. Prosody transplantation techniques, well known in the art of speech processing, can be used to create new ACSUs that can be added to the segment database in a similar way as CSUs are added to the database.

Spectral Transformation

To enable speaker transformation (e.g. copy synthesis, cartoon voices, voice rejuvenation or voice ageing transformation, etc.) frequency warping of the spectral parameters can be applied. To enable this, one can send in addition to a segment identifier, a spectral warping factor. At the retrieval and interpolation moment of the spectral vectors, the warping into frequency domain is applied. The warping effect can be performed in a general way (same warping for all segments), or a segment-by-segment varying warping factor (see also distributed TTS system).

CSU-Based Unit Selector Bootstrap Training Algorithm

The validation of CSUs through iterative listening is a labor-intensive task. If reference data is available, this task could be automated by computing an objective perceptual distance measure. If there is no reference data available (e.g., very specific domains), an iterative verification by listening to all possible paths is probably needed. When a listening result is satisfactory, the dynamic programming path of the unit selector is stored as a sequence of segment descriptors into a dedicated database. After having done the listening verification on a dataset, it is advantageous to perform a bootstrap training on the feature weights ($wf_i$) and feature functions ($F(f_i)$)of the unit selector(s) so that the probability that the unit selection automatically generates the correct paths increases.

Figure 18:
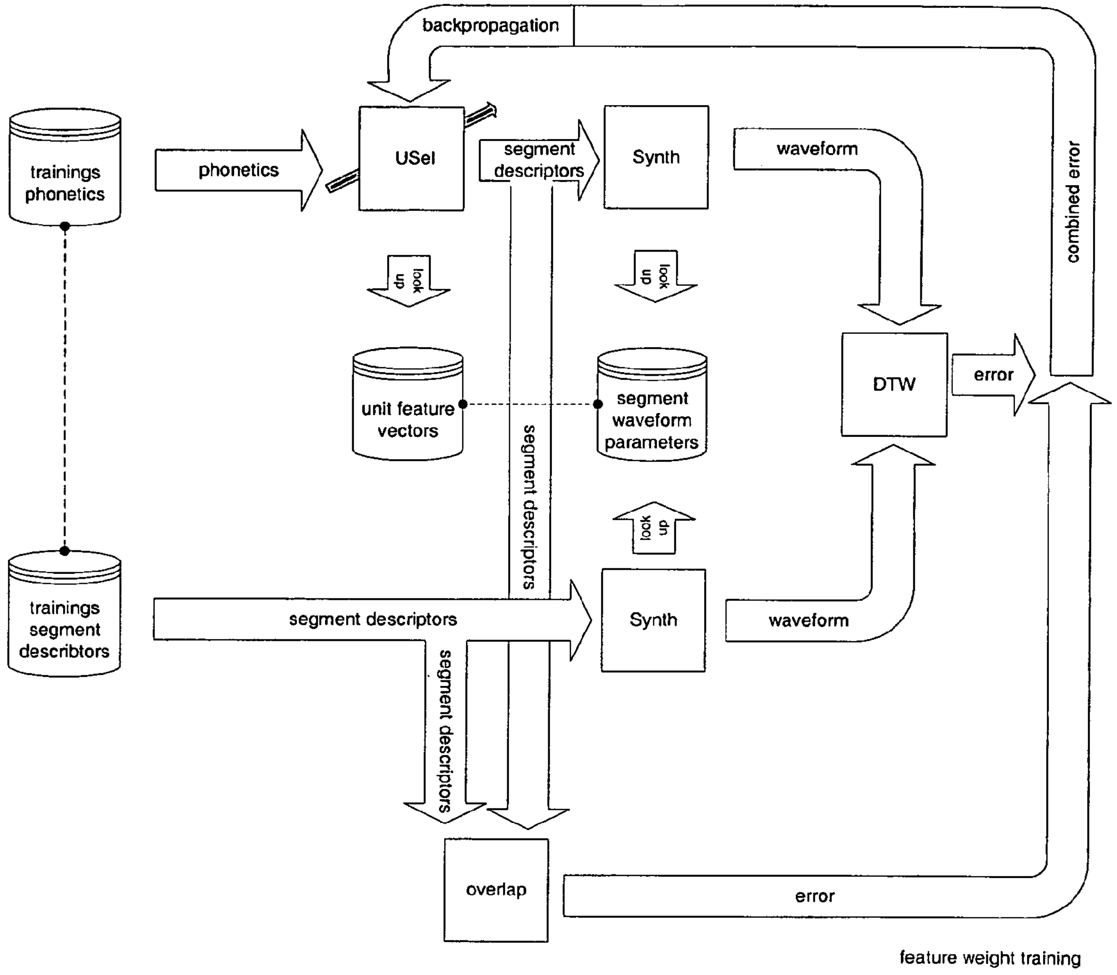
FIG. 18 is a schematic diagram of a weight training system based on compound speech units.

The learning algorithm shown in FIG. 18 seeks to minimize the error ($E_p$) that is composed out of the weighted sum of the segmental overlap error and accumulated normalized cost of the DTW-path between the target (t) and output (o) segment descriptor sequence. The overlap error is defined as the symbolic alignment cost between the target and output segment descriptor sequences:

$$E_p=(w_{overlap}(100-\text{overlap}(t,o))+w_{dtw}\text{Cost}_{path}(t,o))^2$$

The training method uses the steepest descent algorithmic approach adapted for this specific purpose and tries to minimize the error ($E_p$) by adapting the feature weights ($wf_i$) and feature functions ($F(f_i)$) such as duration and pitch probability density functions and also the masking functions. This training method is very similar to the training method of a multi-layer feed-forward neural net. As an alternative training method a dataset can be generated that is composed out of the feature weights ($wf_i$) and feature functions ($F(f_i)$) the features ($f_i$) and the error ($E_p$) by keeping the input of the unit selector constant and letting the feature weights vary. The optimal feature weights and feature functions can be obtained by applying statistical and clustering learning-based methods on the dataset.

Glossary

The definitions below are pertinent to both the present description and the claims following this description.

"Diphone" is a fundamental speech unit composed of two adjacent half-phones. Thus the left and right boundaries of a diphone are in-between phone boundaries. The center of the diphone contains the phone-transition region. The motivation for using diphones rather than phones is that the edges of diphones are relatively steady-state and so it is easier to join two diphones together with no audible degradation, than it is to join two phones together.

"High level" linguistic features of a polyphone or other phonetic unit include with respect to such unit (without limitation), accentuation, phonetic context, and position in the applicable sentence, phrase, word, and syllable.

"Large speech database" refers to a speech database that references speech waveforms. The database may directly contain digitally sampled waveforms, or it may include pointers to such waveforms, or it may include pointers to parameter sets that govern the actions of a waveform synthesizer. The database is considered "large" when, in the course of waveform reference for the purpose of speech synthesis, the database commonly references many waveform candidates, occurring under varying linguistic conditions. In this manner, most of the time in speech synthesis, the database will likely offer many waveform candidates from which a single waveform is selected. The availability of many such waveform candidates can permit prosodic and other linguistic variation in the speech output stream.

"Low level linguistic features" of a polyphone or other phonetic unit includes, with respect to such unit, pitch contour and duration.

"Polyphone" is more than one diphone joined together. A triphone is a polyphone made of 2 diphones.

"SPT (Simple Phonetic Transcription)" describes the phonemes. This transcription is optionally annotated with symbols for lexical stress, sentence accent, etc . . . Example (for the word 'worthwhile'): #'werT-'wYl#

"Triphone" has two diphones joined together. It thus contains three components—a half phone at its left border, a complete phone, and a half phone at its right border.

Embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as pre-programmed hardware elements, other related components, or as a combination of hardware and software components.

Embodiments can be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A speech synthesis system for producing synthesized speech comprising:

a large speech segment database referencing speech segments and accessed by segment designators, each segment designator being associated with a sequence of one or more speech segments;

a segmental transcription database referencing segmental transcriptions associated with sequences of one or more segment designators and accessed by message designators, each message designator being associated with a fixed message;

a speech segment selector for selecting a sequence of speech segments referenced by the large speech segment database and representative of a sequence of segment designators corresponding to a segmental transcription generated responsive to a message designator input; and a speech segment concatenator in communication with the large speech segment database for concatenating the sequence of speech segments selected by the speech segment selector to produce a speech signal output corresponding to the message designator input.

2. A speech synthesis system according to claim 1, in which the segment designators are selected from the group including (i) diphone designators, (ii) demi-phone designators, (iii) phone designators, (iv) triphone designators, (v) demi-syllable designators, and (vi) syllable designators.

3. A speech synthesis system according to claim 1, in which the speech segment concatenator concatenates the sequence of speech segments without altering their prosody.

4. A speech synthesis system according to claim 1, in which the speech segment concatenator smoothes energy at concatenation boundaries of the speech segments when concatenating the sequence of speech segments.

5. A speech synthesis system according to claim 1, in which the speech segment concatenator smoothes pitch at concatenation boundaries of the speech segments when concatenating the sequence of speech segments.

6. A speech synthesis system according to claim 1, in which the speech segment selector is tunable and alternative speech segments can be selected by a user for the selected sequence of speech segments.

7. A speech synthesis system according to claim 1, in which the segment selector is trained on a given segment transcriptor database and alternative speech segments can be selected by a user for the selected sequence of speech segments.

8. A speech synthesis system according to claim 1, adapted for use in a talking dictionary application.

9. A speech synthesis system for producing synthesized speech from input text and from input message designators, the system comprising:

first and second large speech segment databases referencing speech segments and accessed by segment designators, each speech segment designator being associated with a sequence of one or more speech segments;

a segmental transcription database referencing segmental transcriptions associated with sequences of one or more segment designators of the first large speech segment database and accessed by message designators, each message designator being associated with a fixed message;

a text message database referencing text messages that correspond to orthographic representations of the segmental transcriptions referenced by the segmental transcription database;

a first speech segment selector for selecting a sequence of speech segments referenced by the first large speech segment database and representative of a sequence of segment designators corresponding to a segmental transcription generated responsive to a message designator input; a text analyzer for converting an input text into a representative sequence of symbolic segment identifiers;

a second speech segment selector for selecting, based at least in part on prosodic and acoustic features, a sequence of speech segments from the second large speech segment database and representative of a sequence of symbolic identifiers generated responsive to a text input; a message decoder for activating i. the first speech segment selector if a text input corresponds to a text message referenced by the text message database, or ii. the second speech segment selector if a text input does not correspond to a message from the text message database; and a speech segment concatenator in communication with the first and second large speech segment databases for concatenating the sequence of speech segments designated by a segmental transcription from the segmental transcription database to produce a speech signal output.

10. A speech synthesis system according to claim 9, in which the first and second large speech segment databases are the same.

11. A speech synthesis system according to claim 9, in which the first large speech segment database is a subset of the second large speech segment database.

12. A speech synthesis system according to claim 9, in which the first and second large speech segment databases are disjoint.

13. A speech synthesis system according to claim 9, wherein the first and second large speech segment databases are in different locations and an output data stream of segment transcriptions, speech transformation descriptors, and control codes from one location to the other allows distributed speech synthesis.

14. A speech synthesis system according to claim 9 adapted for use in a talking dictionary application.

15. A system to create compound speech units from an input text comprising:

a speech segment database referencing speech waveform segments and accessed by segment designators, each segment designator being associated with a sequence of one or more speech segments;

a speech segment selector for selecting a sequence of speech segments referenced by the speech segment database and representative of an input text; and a speech segment sequence validator for validating the selected sequence of speech segments; and a linguistic feature vector extractor for extracting linguistic feature vectors from the validated sequence of speech segments; and a segment descriptor generator for linking an extracted linguistic feature vector to a speech waveform segment from the speech segment database.

16. A system according to claim 15, wherein the validated synthesized speech comes from a dataset of synthesized messages classified according to one or more perceptual distance measurements.

17. A speech segment database enhancing system to increase feature variation comprising:

a system according to claim 15 to generate compound speech units from a text corpus; and a database engine for creating a database of compound speech units.

18. A speech segment database enhancing system according to claim 17, wherein a single set of acoustic features is stored for each speech waveform segment referenced by the speech segment database and wherein at least one speech waveform segment has two or more associated linguistic feature vectors.

19. A speech synthesis system for producing synthesized speech from input text comprising:

a speech segment database referencing speech segments and accessed by segment designators, each segment designator being associated with a sequence of one or more speech segments;

a basic speech unit descriptor database including linguistic feature vectors descriptive of individual speech segments referenced by the speech segment database;

a compound speech unit database including linguistic feature vectors descriptive of speech segments referenced by the speech segment database, at least one speech segment from the speech segment database has two or more linguistic feature vectors as linguistic descriptors;

a speech segment selector for selecting, based on a reduced set of features and cost functions, a sequence of speech segments referenced by the speech segment database and representative of an input text; and a speech segment concatenator, in communication with the speech segment database, for concatenating the selected sequence of speech segments to produce a speech signal output corresponding to the input text.

20. A first speech synthesis system according to claim 19, wherein the speech segment selector is adapted to imitate the unit selection behavior of a second more complex speech synthesis system based on at least one of a richer feature set and more complex cost functions, by integrating into the compound speech unit database of the first synthesis system data derived from the output of the second more complex speech synthesis system.

21. A speech synthesis system according to claim 20, wherein the compound speech unit database includes linguistic feature vectors from compound speech units derived from synthesized speech validated by an algorithm of perceptual measures.

22. A speech synthesis system according to claim 21, wherein the validation takes into account as side products from the speech segment selector at least one cost selected from the group of a normalized path cost, a peak cost, and a cost distribution along a best path.

23. A speech synthesis system for producing synthesized speech from input text comprising:

a speech segment database referencing speech segments and accessed by segment designators, each segment designator being associated with a sequence of one or more speech segments;

a speech segment selector for selecting among candidate sequences of speech segments referenced by the speech segment database and representative of an input text, the selecting including use of a composition table containing pairs of segment designators to minimize adjacency feature mismatch effects; and a speech segment concatenator, in communication with the speech segment database, for concatenating the selected sequence of speech segments to produce a speech signal output corresponding to the input text.

24. A speech synthesis system for producing synthesized speech from input text comprising:

a speech segment database referencing speech segments and accessed by segment designators, each segment designator being associated with a sequence of one or more speech segments;

a user dictionary of compound speech units referenced by the speech segment database and accessed by phoneme sequences;

a speech segment selector for selecting among candidate sequences of speech segments referenced by the speech segment database and representative of an input text, the selecting including use of compound speech units from the user dictionary; and a speech segment concatenator, in communication with the speech segment database, for concatenating the selected sequence of speech segments to produce a speech signal output corresponding to the input text.

25. A speech synthesis system according to claim 24, wherein instead phoneme sequences grapheme sequences are used.

26. A speech synthesis system for producing synthesized speech from input text comprising:

a large speech segment database referencing speech segments and accessed by segment designators, each segment designator being associated with a sequence of one or more speech segments;

a carrier database containing carriers for a carrier and slot speech synthesis application, each carrier represented as a sequence of segment descriptors; and a speech carrier selector for selecting the carrier from the carrier database;

a speech segment selector for selecting a sequence of speech segments referenced by the large speech segment database and representative of a slot argument in a carrier and slot speech synthesis message; and a speech segment concatenator, in communication with the large speech segment database, for concatenating the selected sequence of speech segments with the carrier portion of a carrier and slot speech synthesis message to produce a speech signal output corresponding to the carrier and slot speech synthesis message.

27. A restricted domain speech synthesis system for producing synthesized speech from a restricted domain input comprising:

a speech segment database referencing speech segments and accessed by segment designators, each segment designator being associated with a sequence of one or more speech segments; and a segment sequence database containing sequences of speech segment designators;

a speech segment selector for selecting a sequence of speech segments referenced by the large speech segment database from the segment sequence database; and a speech segment concatenator, in communication with the large speech segment database and the segment sequence database, for concatenating the selected sequence of speech segments to produce a speech signal output corresponding to the restricted domain input.

28. A restricted domain speech synthesis system according to claim 27, wherein the large speech segment database and the segment sequence database are constructed by means of a validation process.

29. A speech synthesis system for producing synthesized speech from input text comprising:

a large speech segment database referencing speech segments and accessed by segment designators, each segment designator being associated with a sequence of one or more speech segments;

a speech segment selector for selecting a sequence of speech segments referenced by the large speech segment database and representative of an input text; and a speech segment concatenator, in communication with the large speech segment database, for concatenating the selected sequence of speech segments to produce a speech signal output corresponding to the input text;

wherein compound speech units are used to increase the match between a grapheme-to-phoneme conversion of the input text and the segment designators.

30. A speech synthesis system for producing synthesized speech from input text comprising:

a large speech segment database referencing speech segments and accessed by segment designators, each segment designator being associated with a sequence of one or more speech segments, where coding of the speech segments approximates the variation of the prosody parameters over time by piece-wise linear functions that are stored as breakpoint-slope pairs;

a speech segment selector for selecting a sequence of speech segments referenced by the large speech segment database and representative of an input text; and a speech segment concatenator, in communication with the large speech segment database, for concatenating the selected sequence of speech segments to produce a speech signal output corresponding to the input text.

* * * * *